(12) United States Patent
Wang

(10) Patent No.: US 10,766,451 B2
(45) Date of Patent: Sep. 8, 2020

(54) BUFFER DEVICE

(71) Applicant: Liang-Hsiung Wang, Tainan (TW)

(72) Inventor: Liang-Hsiung Wang, Tainan (TW)

(*) Notice: Subject to any disclaimer, the term of this patent is extended or adjusted under 35 U.S.C. 154(b) by 40 days.

(21) Appl. No.: 16/023,817

(22) Filed: Jun. 29, 2018

(65) Prior Publication Data

US 2019/0001922 A1 Jan. 3, 2019

(30) Foreign Application Priority Data

Jul. 3, 2017 (TW) .............................. 106122248 A

(51) Int. Cl.
*B60R 22/20* (2006.01)
*B60R 22/18* (2006.01)
*B60R 22/10* (2006.01)
*A44B 11/00* (2006.01)
*B60R 22/28* (2006.01)
*B60R 22/02* (2006.01)
*A44B 11/25* (2006.01)
*B60R 22/19* (2006.01)
*B60R 22/26* (2006.01)

(52) U.S. Cl.
CPC .............. *B60R 22/28* (2013.01); *B60R 22/18* (2013.01); *A44B 11/258* (2013.01); *A44B 11/2557* (2013.01); *B60R 22/023* (2013.01); *B60R 22/105* (2013.01); *B60R 22/19* (2013.01); *B60R 22/20* (2013.01); *B60R 22/26* (2013.01); *B60R 2022/1818* (2013.01); *B60R 2022/1831* (2013.01)

(58) Field of Classification Search
CPC . B60R 22/28; B60R 22/18; B60R 2022/1818; B60R 22/20; B60R 22/19; B60R 22/26; B60R 22/024; B60R 22/105; A44B 11/2557; A44B 11/258
See application file for complete search history.

(56) References Cited

U.S. PATENT DOCUMENTS

| | | | | |
|---|---|---|---|---|
| 7,232,155 | B2* | 6/2007 | Nishizawa | B60R 22/4604 280/805 |
| 9,980,537 | B2* | 5/2018 | Aoyagi | A44B 11/2561 |
| 2004/0253048 | A1* | 12/2004 | Schulz | B60R 22/24 403/122 |
| 2006/0170200 | A1* | 8/2006 | Sundararajan | B60R 21/18 280/733 |
| 2013/0299620 | A1* | 11/2013 | Miyoshi | B60R 22/1952 242/374 |

* cited by examiner

*Primary Examiner* — Tan Le
(74) *Attorney, Agent, or Firm* — Muncy, Geissler, Olds & Lowe, P.C.

(57) ABSTRACT

A buffer device has a plate, a moveable ring, and an elastic member. The plate has an insertion hole formed through the plate, a connecting portion, and a retaining hole. The connecting portion and the retaining hole are formed on the plate and are located above the insertion hole of the plate. The moveable ring is moveably mounted out of a front side of the plate and has a slot. The slot is formed through the moveable ring. The elastic member is connected with the connecting portion of the plate and the moveable ring. A top section of the elastic member is wound on the connecting portion of the plate. A bottom section of the elastic member is wound on a top section of the moveable ring and passes through the slot of the moveable ring.

4 Claims, 20 Drawing Sheets

BUFFER DEVICE

This application claims the benefit of Taiwan patent application No. 106122248, filed on Jul. 3, 2017, the entire contents of which are incorporated herein by reference.

BACKGROUND OF THE INVENTION

1. Field of the Invention

The present invention relates to a buffer device, and more particularly to a buffer device that is applied to a seat belt mechanism in a vehicle and may work as a guiding device for connecting the webbing, or as a fixing device for connecting a connecting belt and a buckle, or as a locking device, and may provide a cushioning resilience.

2. Description of Related Art

For maintaining the safety of every occupant seated in a vehicle, a conventional seat belt mechanism is mounted in the vehicle to protect the occupant. A webbing of the conventional seat belt mechanism is obliquely passed the front of the occupant's torso by a guiding device. The guiding device is mounted in the vehicle and is close to a top inner surface of the vehicle. The webbing being pulled from a retractor is passed through the guiding device. The guiding device provides effects on guiding, supporting, and force bearing. A tongue is mounted on the webbing and is inserted into a buckle connected to the webbing beside a seat of the vehicle. The webbing may provide a triangular fixing effect to the occupant.

In the conventional seat belt mechanism, the guiding device, the buckle, a fixing device for a connecting belt, and other fixing devices are made of rigid elements and are fixed in the vehicle by fixing members. The conventional seat belt mechanism does not have a cushion effect. When the webbing is forced, the impact force acting on the guiding device and the fixing device of the buckle is excessive. Therefore, a conventional buffer device is connected to the webbing of the conventional seat belt mechanism. When the vehicle is braking, the occupant moves forward by inertia and pulls the webbing. The conventional buffer device is forced by the webbing. Resilience members of the conventional buffer device provide a cushioning resilience to reduce the impact force.

With reference to FIG. 25, the conventional buffer device has a fixing frame 50. A moving seat 51 is mounted in the fixing frame 50 and moves upwardly and downwardly. The fixing frame 50 is connected to a first belt 60. The moving seat 51 is connected to a second belt 61. Two main springs 52 are disposed at a spaced interval. Two ends of each main spring 52 are connected to a top end of the moving seat 51 and a top section of the fixing frame 50. Two first springs 53 and two second springs 54 are mounted on a bottom end of the moving seat 51 and extend downwardly. The length of each first spring 53 is different from the length of each second spring 54. The moving seat 51 in the fixing frame 50 moves toward a direction that makes the first belt 60 away from the second belt 61. The main springs 52 provide the cushioning resilience. Under the condition that the main springs 52 cannot stop the first belt 60 from moving away from the second belt 61, the first springs 53 and the second springs 54 provide the cushioning resilience.

The conventional buffer device is connected with the first belt 60 and the second belt 61. The cushioning resilience is provided by the main springs 52 or the first springs 53 and the second springs 54 to decrease the impact force. In the structure of the conventional buffer device, the moving seat 51 mounted in the fixing frame 50 can move straight. The main springs 52 are connected with the moving seat 51 and the fixing frame 50. The fixing frame 50 is connected to the first belt 60. The moving seat 51 is connected to the second belt 61. The moving seat 51 is limited by the fixing seat 50 and moves along two opposite sides of the fixing frame 50 upwardly and downwardly. For generating the cushion effect of the conventional buffer device, the length of the fixing frame 50 should be long enough for providing a required movement travel to the moving seat 51. Thus, the fixing frame 50 is large in size and the volume of the conventional buffer device is large. When the volume of the conventional buffer device is decreased, the cushion effect of the conventional buffer device is decreased, too.

Moreover, the conventional buffer device is connected to the first belt 60 by the fixing frame 50, and is connected to the second belt 61 by the moving seat 51. The first belt 60 and the second belt 61 are separated. The first belt 60 exerts forces on the fixing frame 50. The second belt 61 exerts forces on the moving seat 51. When the main springs 52 are damaged and the cushion effect is lost, the conventional seat belt mechanism is disabled.

To overcome the shortcomings, the present invention provides a buffer device to mitigate or obviate the aforementioned problems.

SUMMARY OF THE INVENTION

The objective of the invention is to provide a buffer device to solve the problem that the conventional buffer device having the cushion effect in the seat belt mechanism can hardly decrease the volume.

The buffer device of the present invention has a plate, a moveable ring, and an elastic member. The plate has a front side, an insertion hole formed through the plate, a connecting portion, and a retaining hole. The connecting portion and the retaining hole are formed on the plate and are located above the insertion hole of the plate. The moveable ring is moveably mounted out of the front side of the plate and has a slot and a top section. The slot is formed through the moveable ring. The elastic member is connected with the connecting portion of the plate and the moveable ring. The elastic member has a top section and a bottom section. The top section of the elastic member is wound on the connecting portion of the plate. The bottom section of the elastic member is wound on the top section of the moveable ring and passes through the slot of the moveable ring.

In the buffer device, the moveable ring is mounted out of the plate, and the elastic member is connected with the connecting portion of the plate and the moveable ring. The buffer device may be applied to the seat belt mechanism, or may work as a guiding device for a webbing to pass through, or as a fixing device for connecting a buckle and a connecting belt, or as a locking device. The webbing or the connecting belt is inserted through the insertion hole of the plate and the moveable ring. The moveable ring is pulled by the webbing and moves relative to the plate. The elastic member may provide a cushioning resilience to decrease the impact force. The moveable ring is mounted out of the plate and moves outside the plate. The cushioning travel is relatively long. The size of the plate may be changed depending on the product demand, appropriately decreasing the volume and the cost without decreasing the cushion effect of the buffer device.

In addition, the webbing is inserted through the insertion hole of the plate and the slot of the moveable ring. The plate and the moveable ring are made of rigid elements. The plate is mounted in the vehicle by the fixing members. The buffer device can bear the force from the webbing. Even though the elastic member connected with the plate and the moveable ring is damaged and loses the cushion effect, when the moveable ring is pulled and moves downward to a top edge of a bottom of the plate, the webbing contacts a top edge of a bottom of the insertion hole. Thereby, the rigid plate mounted in the vehicle can support the webbing and bear the force from the webbing. The seat belt mechanism still works normally.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
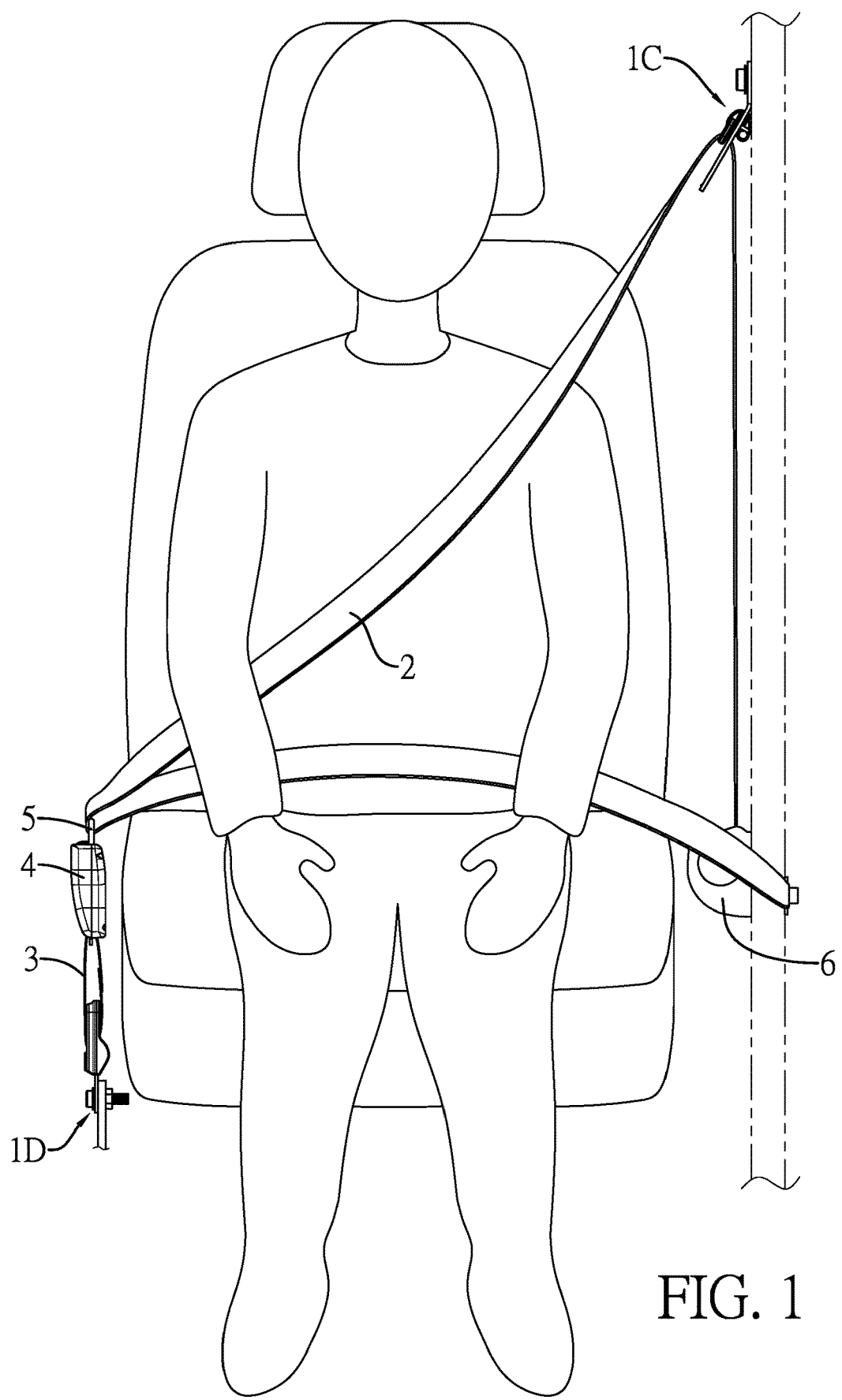
FIG. 1 is an operational side view of a buffer device in accordance with the present invention, showing the buffer device is assembled on a seat belt mechanism for an occupant.

With reference to FIG. 1, a buffer device in accordance with the present invention is applied to a seat belt mechanism in a vehicle for connecting a webbing to provide a cushion effect. The webbing may be a webbing 2 extracted out of a retractor 6, or a connecting belt 3 connected to a buckle 4 in the seat belt mechanism.

FIGS. 2, 5, 8, 15, 20, and 22 show multiple embodiments of the buffer devices 1A, 1B, 1C, 1D, 1E, 1F in accordance with the present invention, and each embodiment comprises a plate 10A, 10B, 10C, 10D, 10E, 10F, a moveable ring 20, and an elastic member 30. The plate 10A, 10B, 10C, 10D, 10E, 10F and the moveable ring 20 are made of rigid elements. The elastic member 30 is made of a soft element that is flexible and resilient.

Figure 22:
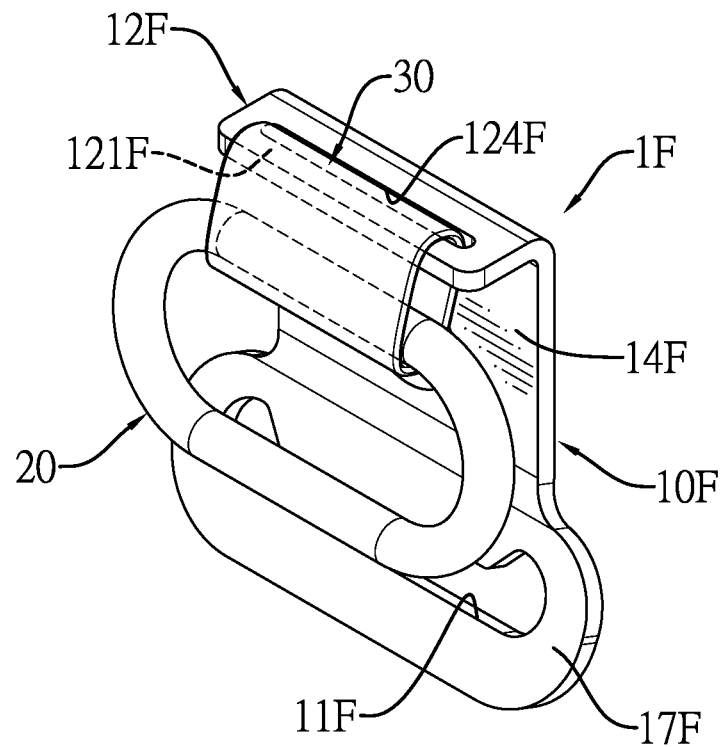
FIG. 22 is a perspective view of a sixth embodiment of a buffer device in accordance with the present invention.
Figure 23:
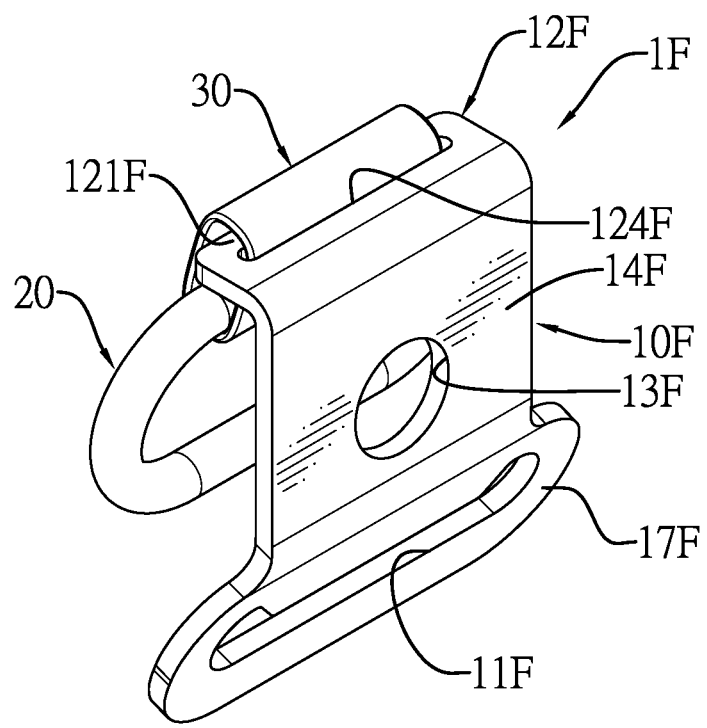
FIG. 23 is another perspective view of the buffer device in FIG. 22.

The plate 10A, 10B, 10C, 10D, 10E, 10F has a front side, a rear side, an insertion hole 11A, 11B, 11C, 11D, 11E, 11F, a connecting portion 12A, 12B, 12C, 12D, 12E, 12F, and a retaining hole 13A, 13B, 13C, 13D, 13E, 13F. The insertion hole 11A, 11B, 11C, 11D, 11E, 11F and the retaining hole 13A, 13B, 13C, 13D, 13E, 13F are formed through the plate 10A, 10B, 10C, 10D, 10E, 10F. The insertion hole 11A, 11B, 11C, 11D, 11E, 11F is deposited below the retaining hole 13A, 13B, 13C, 13D, 13E, 13F. With reference to FIGS. 3, 6, 9, 16, and 20, the connecting portion 12A, 12B, 12C, 12D, 12E is formed between the insertion hole 11A, 11B, 11C, 11D, 11E and the retaining hole 13A, 13B, 13C, 13D, 13E. With reference to FIGS. 22 and 23, the connecting portion 12F is formed above the insertion hole 11F. The retaining hole 13F is located between the connecting portion 12F and the insertion hole 11F.

The moveable ring 20 is moveably mounted out of the front side of the plate 10A, 10B, 10C, 10D, 10E, 10F. The moveable ring 20 has a slot 21 formed through the moveable ring 20 and a protective layer 22 covered on an outer surface of the moveable ring 20. The protective layer 22 is made of rubber to reduce the friction between the moveable ring 20, the elastic member 30, and the webbing 2.

The elastic member 30 is connected with the connecting portion 12A, 12B, 12C, 12D, 12E, 12F of the plate 10A, 10B, 10C, 10D, 10E, 10F and the moveable ring 20. The elastic member 30 is an annular elastic webbing and has a wide and flat cross section. A top section of the elastic member 30 is wound on the connecting portion 12A, 12B, 12C, 12D, 12E, 12F of the plate 10A, 10B, 10C, 10D, 10E, 10F. A bottom of the elastic member 30 passes through the slot 21 of the moveable ring 20 and is wound on a top section of the moveable ring 20. The friction between the moveable ring 20 and the elastic member 30, the friction between the moveable ring 20 and the webbing 2, and the friction between the moveable ring 20 and the connecting belt 3 are reduced by the protective layer 22 covered on the moveable ring 20.

Figure 8:
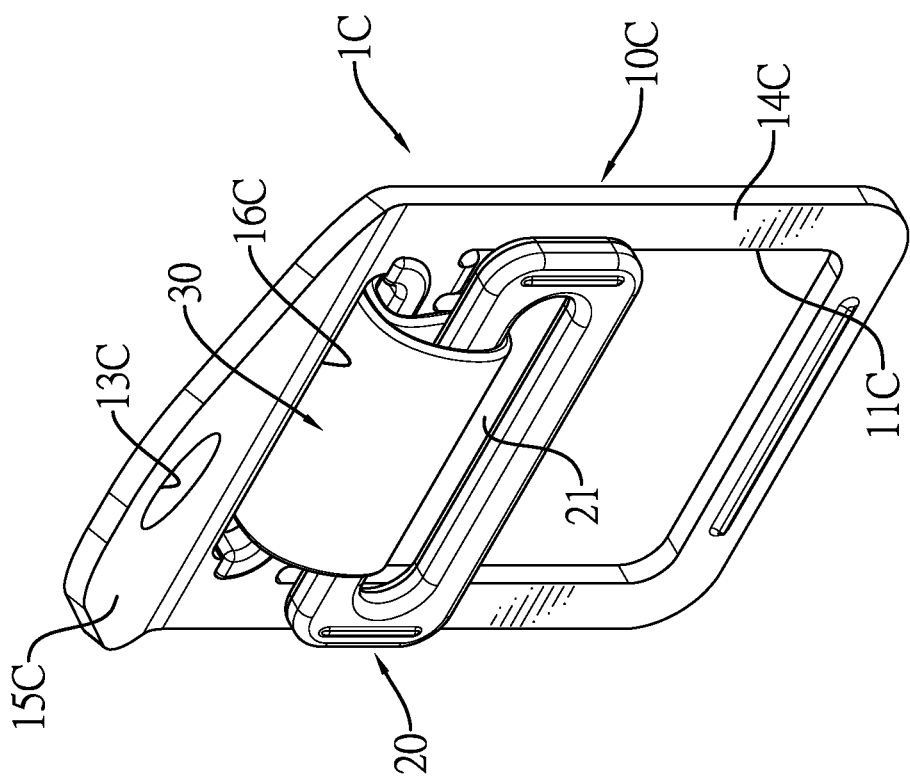
FIG. 8 is a perspective view of a third embodiment of a buffer device in accordance with the present invention.
Figure 10:
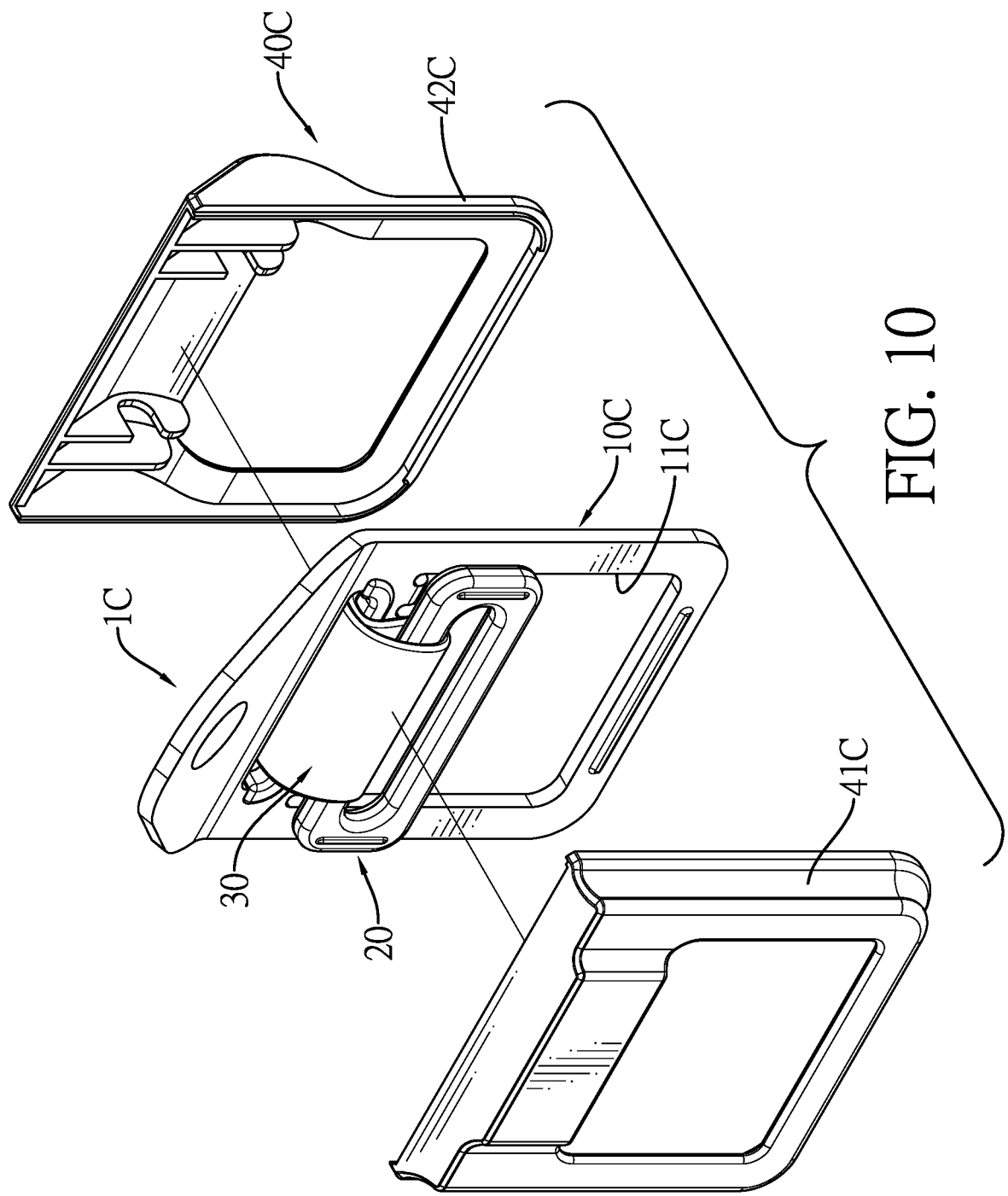
FIG. 10 is an exploded perspective view of the buffer device in FIG. 8, shown with a shell.
Figure 11:
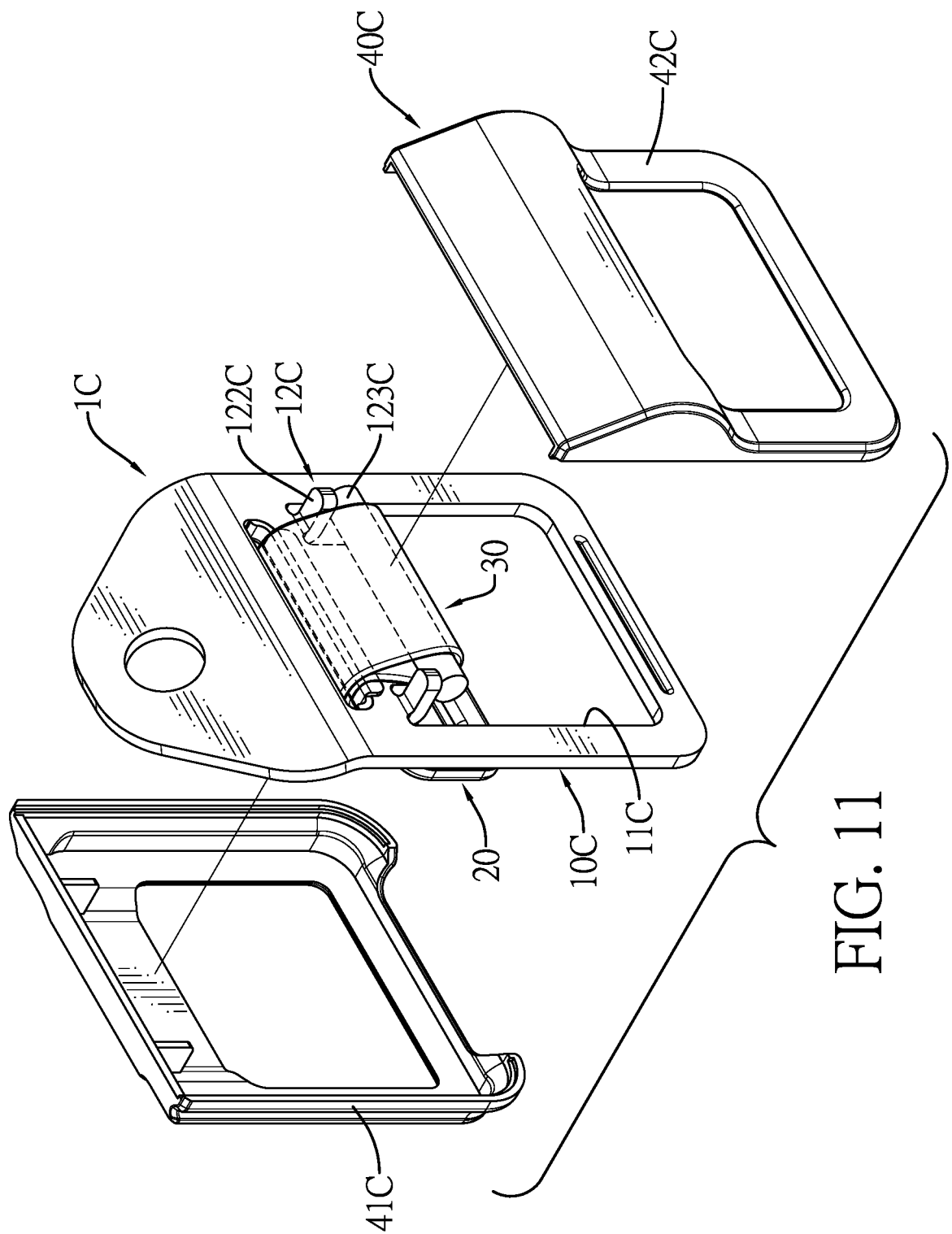
FIG. 11 another exploded perspective view of the buffer device in FIG. 8, shown with the shell.
Figure 12:
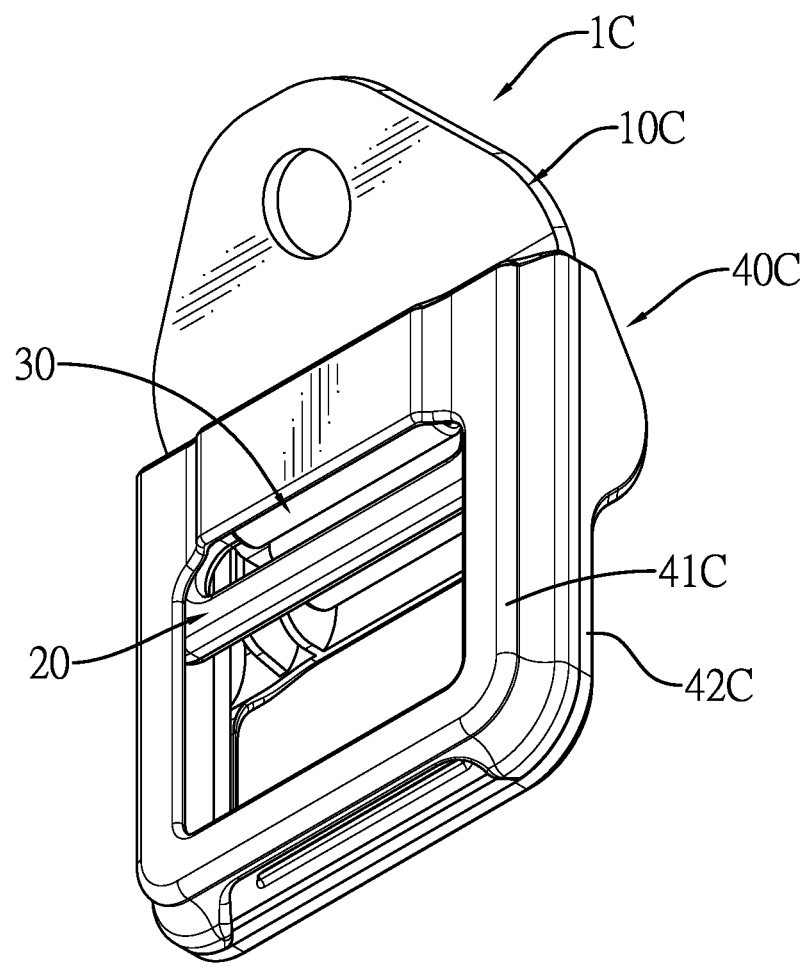
FIG. 12 is a perspective view of the buffer device in FIG. 8 with the shell.
Figure 13:
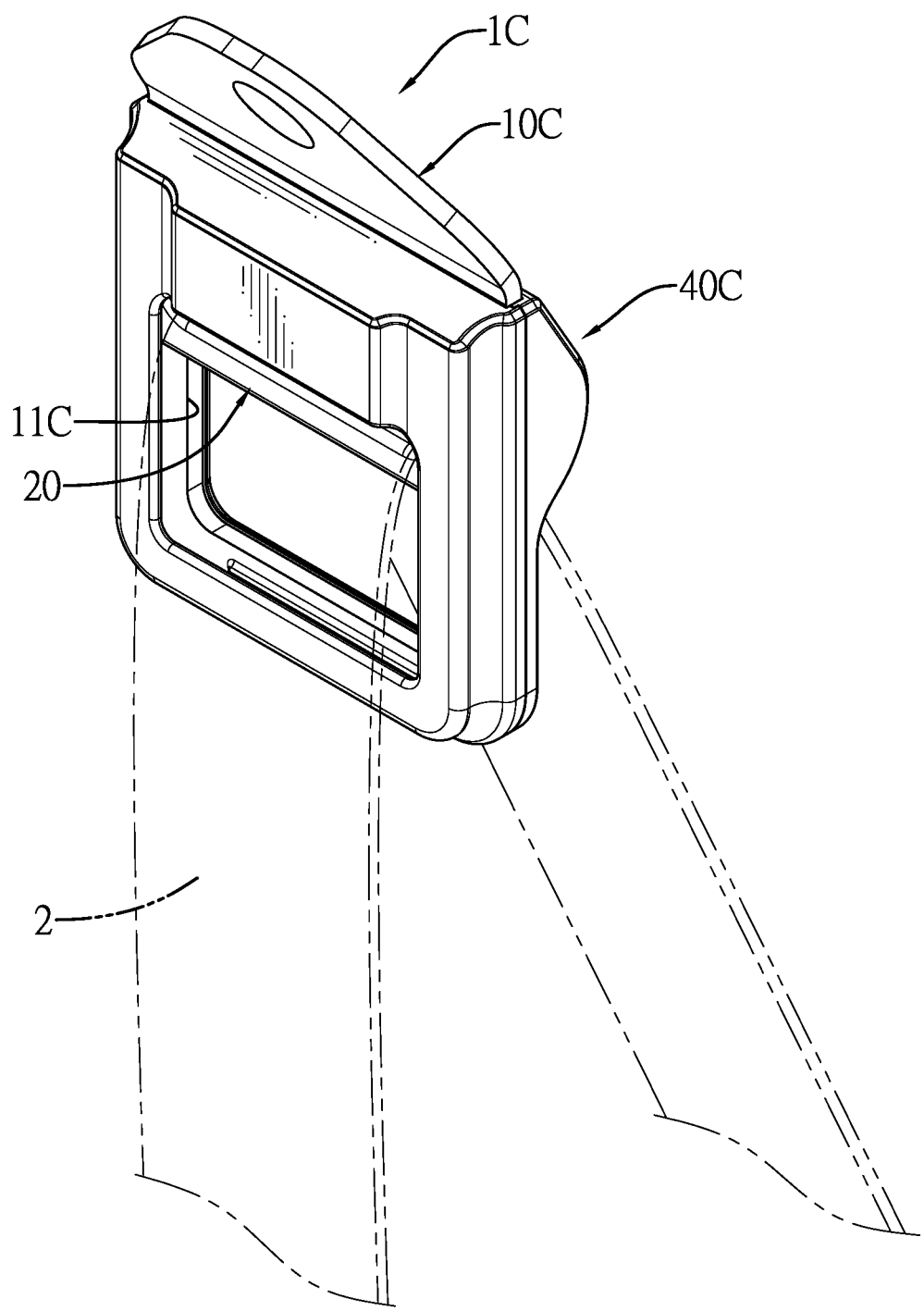
FIG. 13 is a perspective view of the buffer device in FIG. 8 with the shell, showing a webbing is inserted through the shell.
Figure 14:
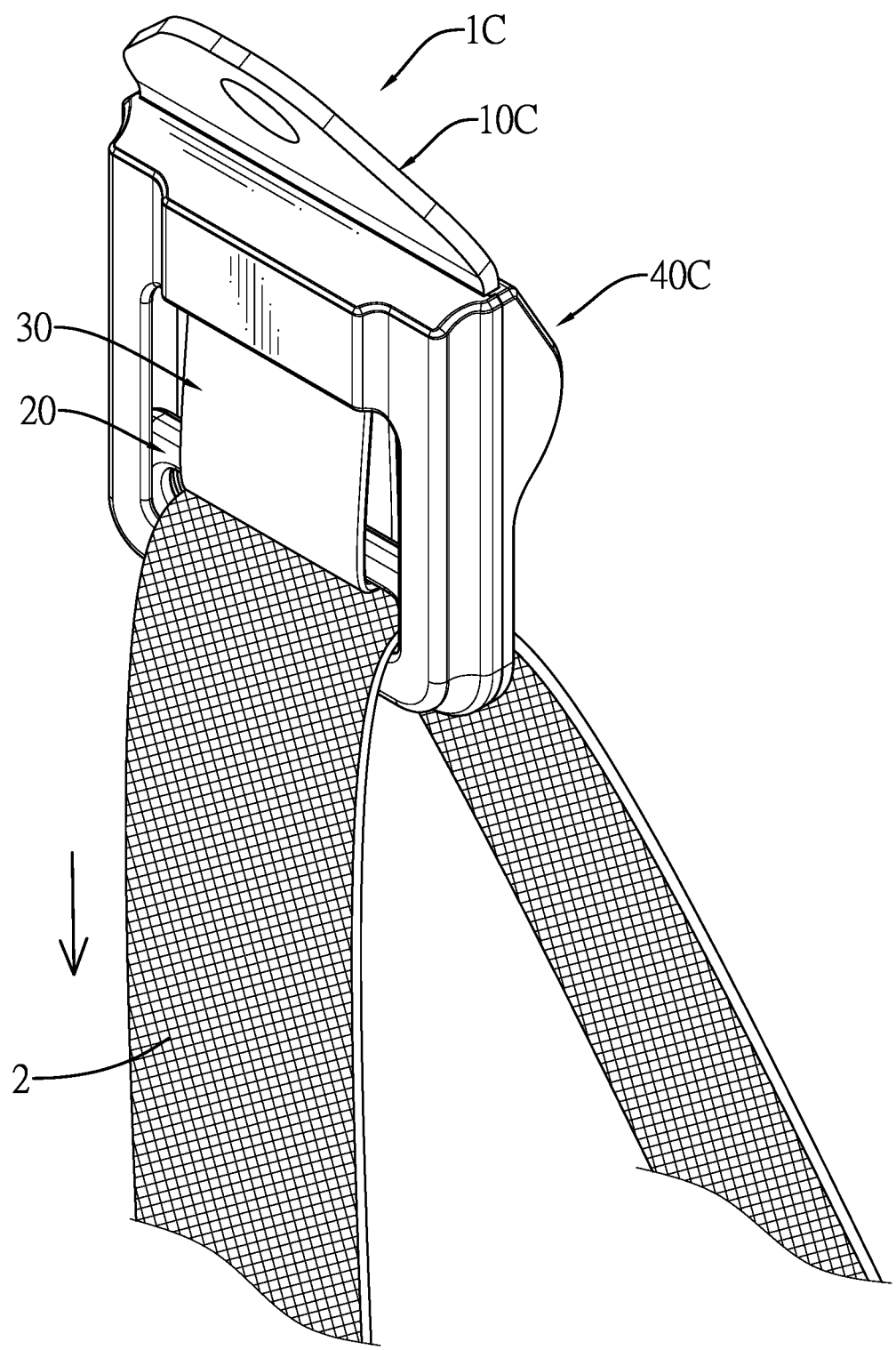
FIG. 14 is an operational perspective view of the buffer device in FIG. 13, showing a moveable ring is pulled by the webbing.

The buffer device is applied to the seat belt mechanism in the vehicle for connecting the webbing and providing a cushion effect. The webbing as described may be the webbing 2 extending out of the retractor 6 in the seat belt mechanism, or the connecting belt 3 connected to the buckle 4 in the seat belt mechanism, or a webbing inserted through a locking device. With reference to FIGS. 1 and 8, the webbing as described works as the webbing 2 extending out of the retractor 6. The buffer device 1C is mounted on a top section of an inner side wall of the vehicle and works as a guiding device of the seat belt mechanism. A fixing element is inserted through the retaining hole 13C of the plate 10C for fixing the plate 10C on the inner side wall of the vehicle.

The webbing 2 extending out of the retractor 6 is upwardly inserted through the insertion hole 11C of the plate 10C and the slot 21 of the moveable ring 20. The elastic member 30 is inserted through the moveable ring 20 and provides the cushioning resilience to the webbing 2 being pulled. When the occupant fastens the seat belt, a tongue 5 mounted on the webbing 2 is inserted into the buckle 4 mounted beside a seat in the vehicle. The webbing 2 provides a triangular fixing effect to the occupant.

Figure 15:
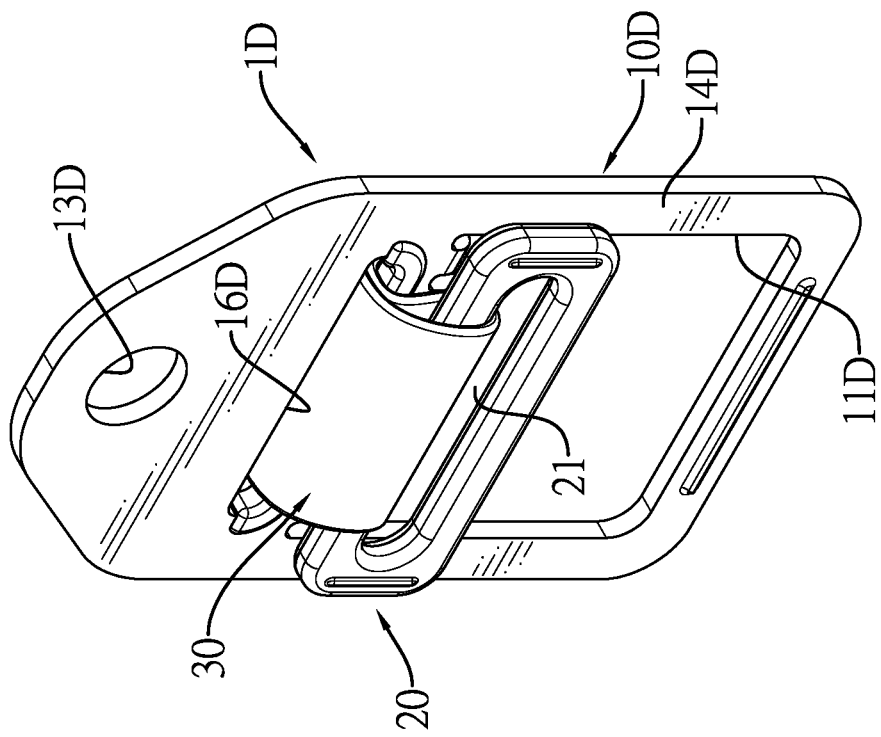
FIG. 15 is a perspective view of a fourth embodiment of a buffer device in accordance with the present invention.

With reference to FIGS. 1 and 15, the webbing as described is regarded as the connecting belt 3 connected to the buckle 4. The buffer device 1D is disposed upside down for connecting the buckle 4. The insertion hole 11D of the plate 10 is deposited beside the seat of the vehicle. The connecting belt 3 is connected to the buckle 4. The connecting belt 3 is inserted through the insertion hole 11D of the plate 10 and the moveable ring 20. An end of the connecting belt 3 opposite to the buffer device 1D is connected to the buckle 4. A fixing element is inserted through the retaining hole 13D of the plate 10D of the buffer device 1D for fixing the plate 10D beside the seat of the vehicle. The elastic member 30 provides the cushioning resilience to the connecting belt 3 connecting the buckle 4 and being pulled.

Figure 3:
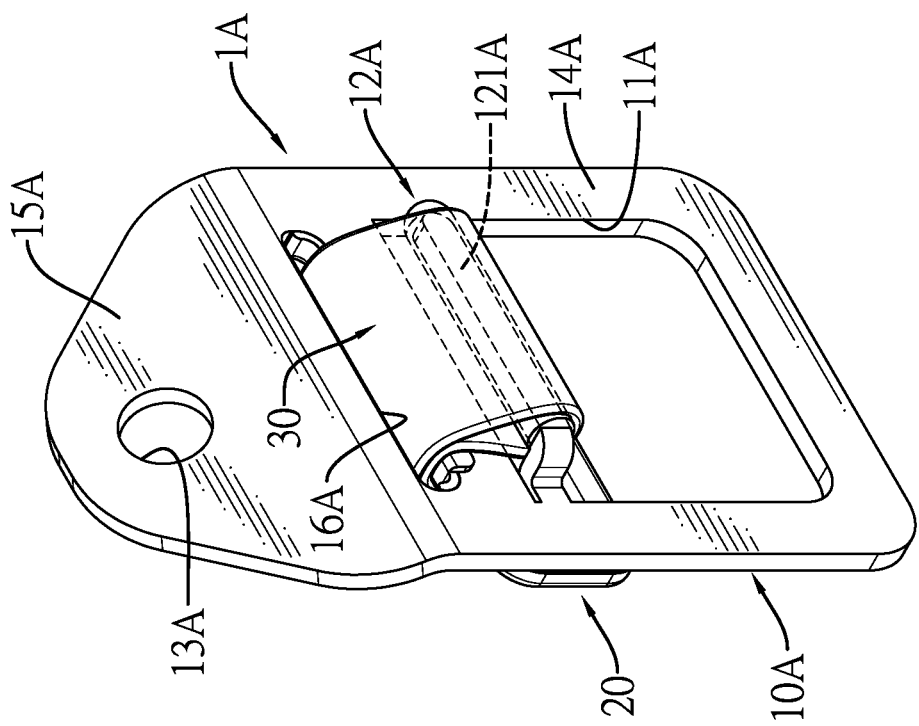
FIG. 3 is another perspective view of the buffer device in FIG. 2.
Figure 2:
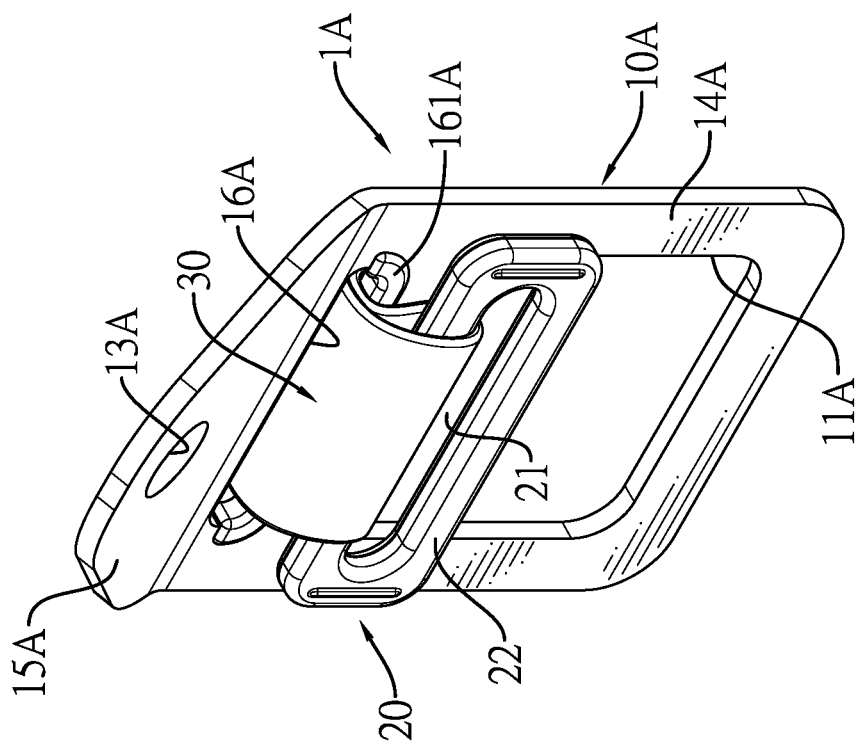
FIG. 2 is a perspective view of a first embodiment of a buffer device in accordance with the present invention.
Figure 4:
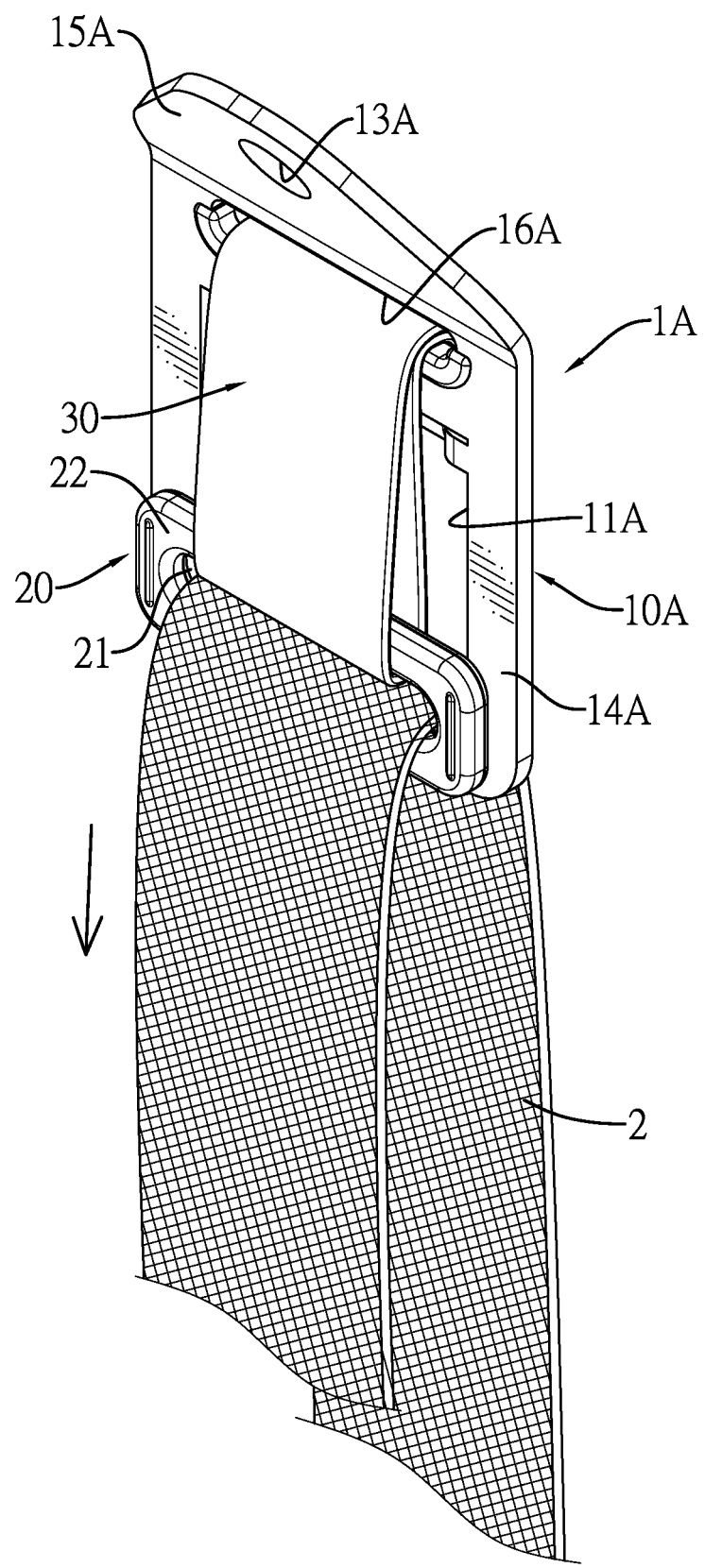
FIG. 4 is an operational perspective view of the buffer device in FIG. 2, showing a moveable ring is pulled by a webbing.

With reference to FIGS. 2 to 4, in the first embodiment of the buffer device 1A, the plate 10A has a base 14A and an inclined portion 15A. The base 14A is formed on the plate 10A. The inclined portion 15A is obliquely formed on a top end of the base 14A and protrudes out of the front side of the plate 10A. The insertion hole 11A is a rectangular hole and is formed through the base 14A. The retaining hole 13A is formed through the inclined portion 15A. The base 14A has a through hole 16A. The through hole 16A is formed through the base 14A and is located between the insertion hole 11A and the inclined portion 15A. The connecting portion 12A is formed on a rear side of the base 14A and is located between the through hole 16A and the insertion hole 11A. The connecting portion 12A has a connecting rod 121A parallel with a lengthwise edge of the through hole 16A. The connecting rod 121A has a first end and a second end. The first end of the connecting rod 121A is bent and is connected to the base 14A. The second end of the connecting rod 121A is opposite to the first end of the connecting rod 121A and is a free end. The plate 10A has a space formed between the connecting portion 12A and the base 14A and formed through the connecting portion 12A from top to bottom of the connecting portion 12A.

The elastic member 30 is annular and has two ends. One of the two ends of the elastic member 30 is inserted through the through hole 16A of the plate 10A out of the rear side of the plate 10A, passes between the free end of the connecting rod 121A and the base 14A, and is mounted around the connecting rod 121A of the connecting portion 12A. The other one of the two ends of the elastic member 30 is inserted out of the front side of the plate 10A and is connected to the top section of the moveable ring 20 located at the front side of the plate 10A. When the elastic member 30 is not pulled, the moveable ring 20 is close to a top edge of the insertion hole 11A. The plate 10A has a protective pad 161A. The protective pad 161A is disposed on a bottom edge of the through hole 161A.

With reference to FIGS. 1, 2, and 4, in the first embodiment of the buffer device 1A, the buffer device 1A works as the guiding device of the seat belt mechanism. The fixing element is inserted through the retaining hole 13A of the plate 10A for fixing the plate 10A on the inner side wall of the vehicle. The webbing 2 extending out of the retractor 6 is inserted through the insertion hole 11A of the plate 10A and the slot 21 of the moveable ring 20. When the occupant fastens the seat belt, the tongue 5 mounted on the webbing 2 is inserted into the buckle 4 mounted beside the seat in the vehicle. The webbing 2 is applied to fix the occupant on the seat. As the vehicle is braking, inertia carries the occupant to move forward and pulls the webbing 2. The moveable ring 20 of the buffer device 1A is pulled by a pulling force of the webbing 2 and moves relative to the plate 10A by the tensile deformation of the elastic member 30. The elastic member 30 provides the cushioning resilience to decrease the impact force. When the pulling force of the webbing 2 is released, the webbing 2 is restored by the resilience of the elastic member 30 and the moveable ring 20.

In the first embodiment of the buffer device 1A, the buffer device 1A works as the guiding device of the seat belt mechanism, and also may work as a fixing device for connecting a buckle and a connecting belt, or may work as a locking device having the fixing effect to provide the cushion effect.

Figure 6:
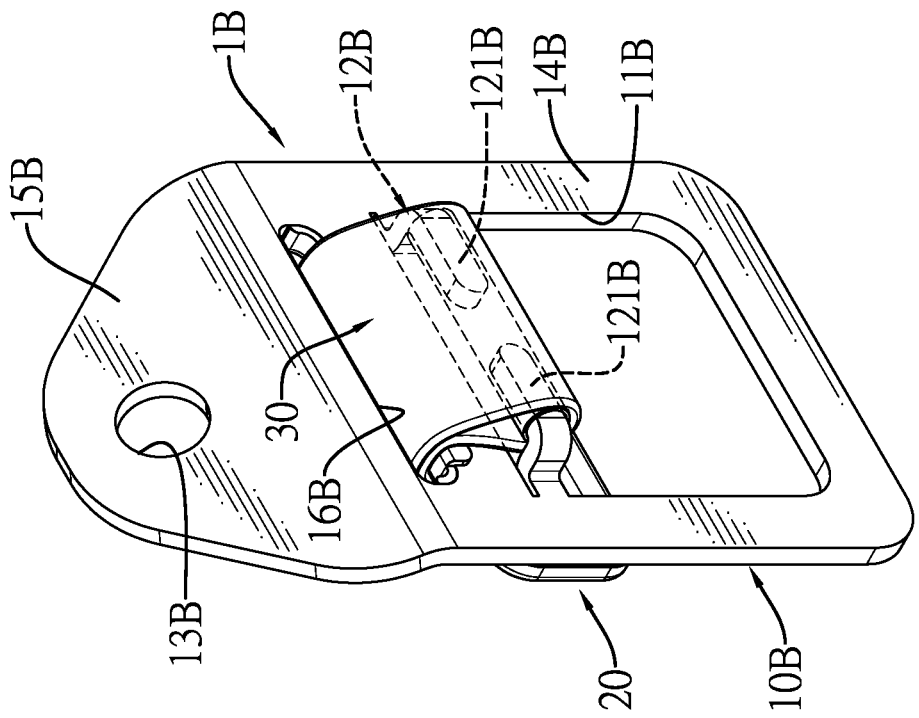
FIG. 6 is another perspective view of the buffer device in FIG. 5.
Figure 5:
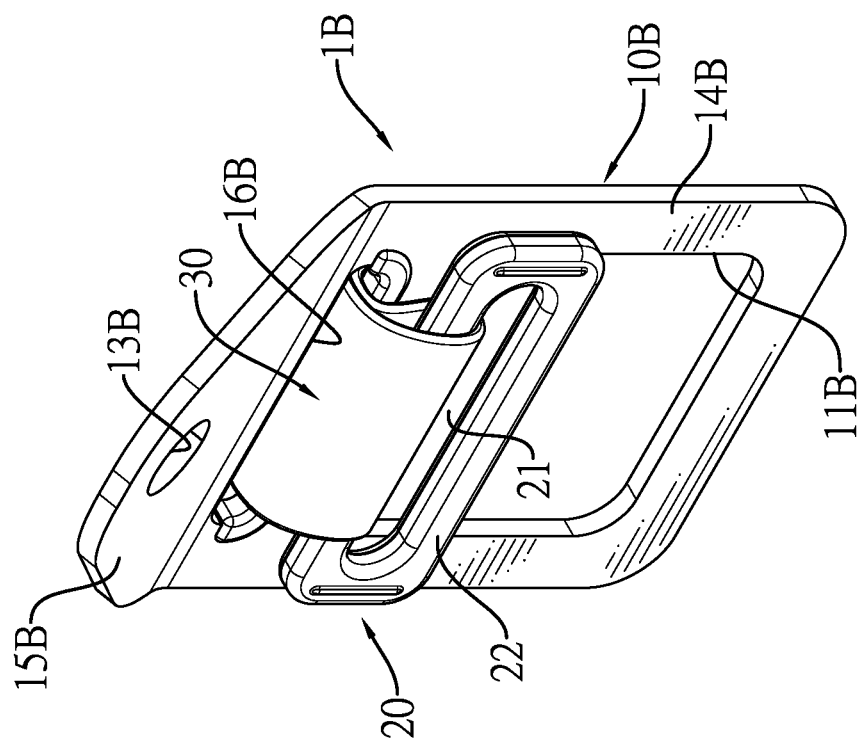
FIG. 5 is a perspective view of a second embodiment of a buffer device in accordance with the present invention.
Figure 7:
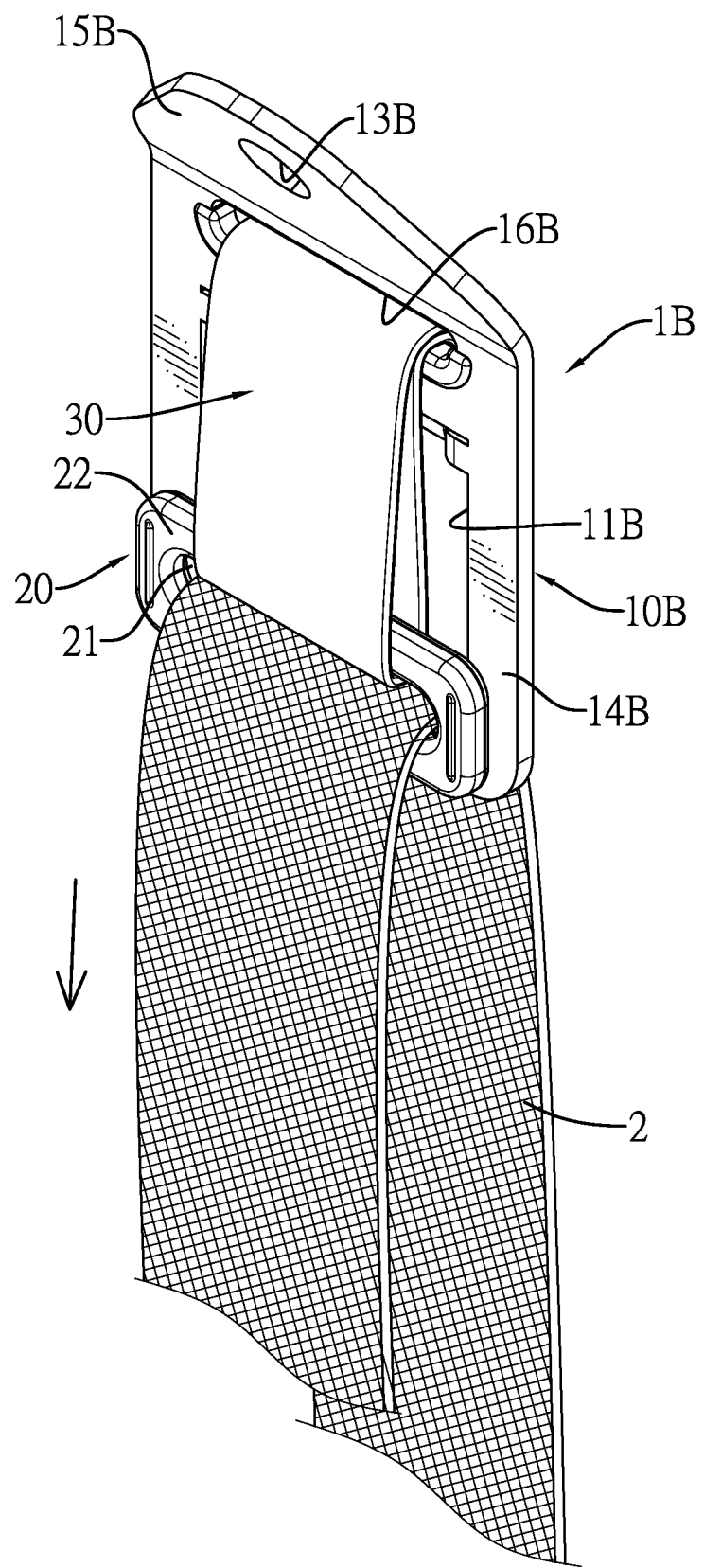
FIG. 7 is an operational perspective view of the buffer device in FIG. 5, showing a moveable ring is pulled by a webbing.

With reference to FIGS. 5 to 7, in the second embodiment of the buffer device 1B, the structure of the second embodiment of the buffer device 1B is similar to the structure of the first embodiment of the buffer device 1A. The difference between the first embodiment of the buffer device 1A and the second embodiment of the buffer device 1B is the connecting portion 12B of the plate 10B. In the second embodiment of the buffer device 1B, the plate 10B has a through hole 16B. The through hole 16B is formed through the base 14B of the plate 10B and is disposed between the insertion hole 11B and the inclined portion 15B. The connecting portion 12B is formed on the rear side of the base 14B and is disposed between the through hole 16B and the insertion hole 11B.

The connecting portion 12B has two connecting rods 121B parallel with the lengthwise edge of the through hole 16B. The two connecting rods 121B both have a first end and a second end. The first ends of the two connecting rods 121B are bent and connected to the base 14B. The second ends of the two connecting rods 121B are opposite the first ends of the two connecting rods 121B and are free ends. The second ends of the two connecting rods 121B are disposed at a spaced interval and are symmetrical with each other. The plate 10B has a space formed between the two connecting portions 121B and the base 14B and formed through the connecting portion 12B from top to bottom of the connecting portion 12B. One of the two ends of the elastic member 30 is inserted through the through hole 16B of the plate 10B, extends out of the rear side of the plate 10B, and is wound on the two connecting rods 121B of the connecting portion 12B. The other one of the two ends of the elastic member 30 is inserted out of the front side of the plate 10B and is connected to the top section of the moveable ring 20 located at the front side of the plate 10B. When the elastic member 30 is not pulled, the moveable ring 20 is close to a top edge of the insertion hole 11B.

For example, the second embodiment of the buffer device 1B works as the guiding device and is connected to the webbing of the seat belt mechanism. The fixing element is inserted through the retaining hole 13B of the plate 10B for fixing the plate 10B on the inner side wall of the vehicle. The webbing 2 extending out of the retractor 6 is inserted through the insertion hole 11B of the plate 10B and the slot 21 of the moveable ring 20. When the occupant fastens the webbing 2, a tongue 5 mounted on the webbing 2 is inserted into the buckle 4 mounted beside a seat in the vehicle. The webbing 2 obliquely passed the front of the occupant's torso is forced by an external force and generates a pulling force. The moveable ring 20 of the buffer device 1B is pulled by the pulling force of the webbing 2. The moveable ring 20 moves relative to the plate 10B by the tensile deformation of the elastic member 30. The elastic member 30 provides the cushioning resilience to decrease the impact force. When the external force is released, the webbing 2 is restored by the resilience of the elastic member 30 and the moveable ring 20.

In the second embodiment of the buffer device 1B, the buffer device 1B works as the guiding device of the seat belt mechanism, and also may work as a fixing device for connecting a buckle and a connecting belt to provide the cushion effect, or may work as a locking device having the fixing effect.

Figure 9:
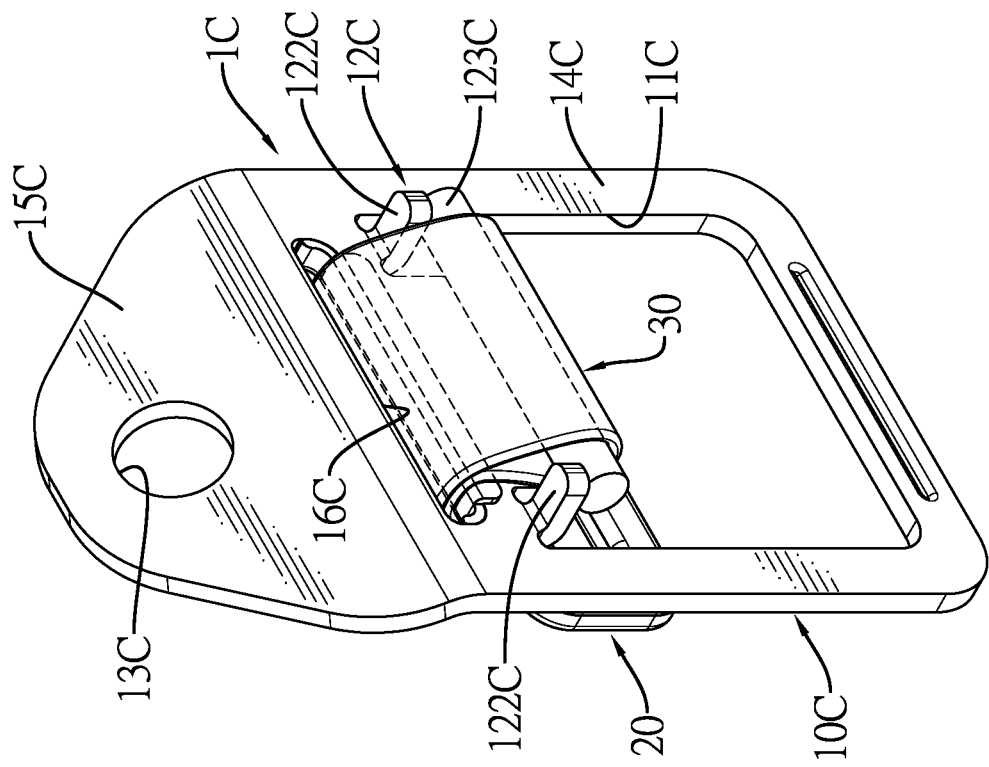
FIG. 9 is another perspective view of the buffer device in FIG. 8.

With reference to FIGS. 8 and 9, in the third embodiment of the buffer device 1C, the structure of the third embodiment of the buffer device 1C is similar to the structure of the first embodiment of the buffer device 1A. The difference between the first embodiment of the buffer device 1A and the third embodiment of the buffer device 1C is the connecting portion 12C of the plate 10C. In the third embodiment of the buffer device 1C, the plate 10C has a through hole 16C. The through hole 16C is formed through the base 14C of the plate 10C and is disposed between the insertion hole 11C and the inclined portion 15C. The connecting portion 12C is formed on the rear side of the base 14C and is disposed between the through hole 16C and the insertion hole 11C. The connecting portion 12C has two stopping parts 122C and a transverse rod 123C.

The two stopping parts 122C are formed on the top edge of the insertion hole 11C, protrude out of the rear side of the plate 10C, and have two bottom surfaces. The transverse rod 123C is disposed at the rear side of the plate 10C and is connected to the two bottom surfaces of the two stopping parts 122C. The elastic member 30 has a first end and a second end. The first end of the elastic member 30 is inserted through the through hole 16C of the plate 10C, extends out of the rear side of the plate 10C, and is wound on the transverse rod 123C. The second end of the elastic member 30 is opposite to the first end of the elastic member 30, extends out of the front side of the plate 10C, and is connected to the top section of the moveable ring 20 located at the front side of the plate 10C. When the elastic member 30 is not pulled, the moveable ring 20 is close to a top edge of the insertion hole 11C.

The third embodiment of the buffer device 1C works as the guiding device and is connected to the webbing of the seat belt mechanism. The usage of the first embodiment of the buffer device 1A, the usage of the second embodiment of the buffer device 1B, and the usage of the third embodiment of the buffer device 1C are the same. The webbing 2 obliquely passed the front of the occupant's torso is forced by an external force and generates a pulling force. The moveable ring 20 of the buffer device 1C is pulled by the pulling force of the webbing 2. The moveable ring 20 moves relative to the plate 10C by the tensile deformation of the elastic member 30. The elastic member 30 provides the cushioning resilience to decrease the impact force. When the external force is released, the webbing 2 is restored by the resilience of the elastic member 30 and the moveable ring 20. In the third embodiment of the buffer device 1C, the buffer device 1C works as the guiding device of the seat belt mechanism, and also may work as a fixing device for connecting a buckle and a connecting belt to provide the cushion effect.

With reference to FIGS. 10 to 13, in the third embodiment of the buffer device 1C, the buffer device 1C further has a first semi-shell 41C and a second semi-shell 42C. The first semi-shell 41C and the second semi-shell 42C are respectively disposed on the front side and the rear side of the plate 10C. The first semi-shell 41C is combined with the second semi-shell 42C to form a shell 40C. The shell 40C has an opening. The opening communicates with the insertion hole 11C of the plate 10C. The moveable ring 20 and the elastic member 30 are located in the shell 40. The webbing 2 is inserted through the insertion hole 11C of the plate 10C, the moveable ring 20, and the opening of the shell 40C. The plate 10C, the moveable ring 20, and the elastic member 30 are protected by the shell 40C.

Figure 16:
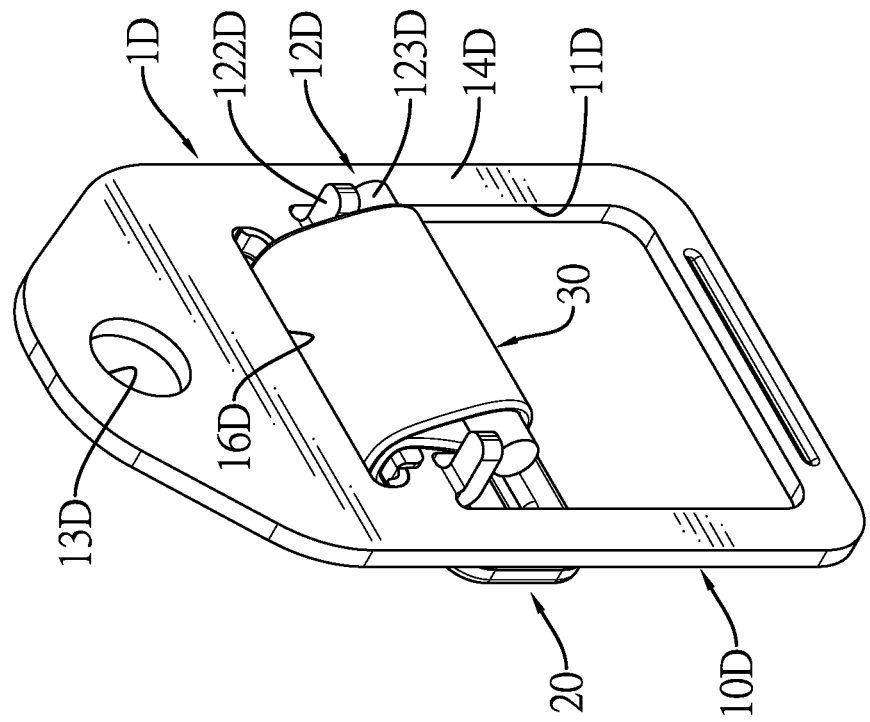
FIG. 16 is another perspective view of the buffer device in FIG. 15.

With reference to FIGS. 15 and 16, in the fourth embodiment of the buffer device 1D, the structure of the fourth embodiment of the buffer device 1D is similar to the structure of the third embodiment of the buffer device 1C. The difference between the third embodiment of the buffer device 1C and the fourth embodiment of the buffer device 1D is the inclined portion 15C. The third embodiment of the buffer device 1C has the inclined portion 15C obliquely formed on the top end of the base 14C. The fourth embodiment of the buffer device 1D has a flat portion formed on the top end of the base 14D. The flat portion is not obliquely formed on the top end of the base 14D. In the fourth embodiment of the buffer device 1D, the plate 10D has a base 14D. The insertion hole 11D is a rectangular hole and is formed through the base 14D. The retaining hole 13D is disposed above the insertion hole 11D. The base 14D has a through hole 16D formed through the base 14D and located between the insertion hole 11D and the retaining hole 13D.

The connecting portion 12D is disposed on the rear side of the base 14D and is located between the through hole 16D and the insertion hole 11D. The connecting portion 12D has two stopping parts 122D and a transverse rod 123D. The two stopping parts 122D are formed on the top edge of the insertion hole 11D and protrude out of the rear side of the plate 10D. The two stopping parts 122D have two bottom surfaces. The transverse rod 123D is disposed at the rear side of the plate 10D and is connected to the two bottom surfaces of the two stopping parts 122D. The elastic member 30 has a first end and a second end. The first end of the elastic member 30 is inserted through the through hole 16D of the plate 10D, extends out of the rear side of the plate 10D, and is wound on the transverse rod 123D. The second end of the elastic member 30 is opposite to the first end of the elastic member 30, extends out of the front side of the plate 10D, and is connected to the top section of the moveable ring 20 located at the front side of the plate 10D.

Figure 17:
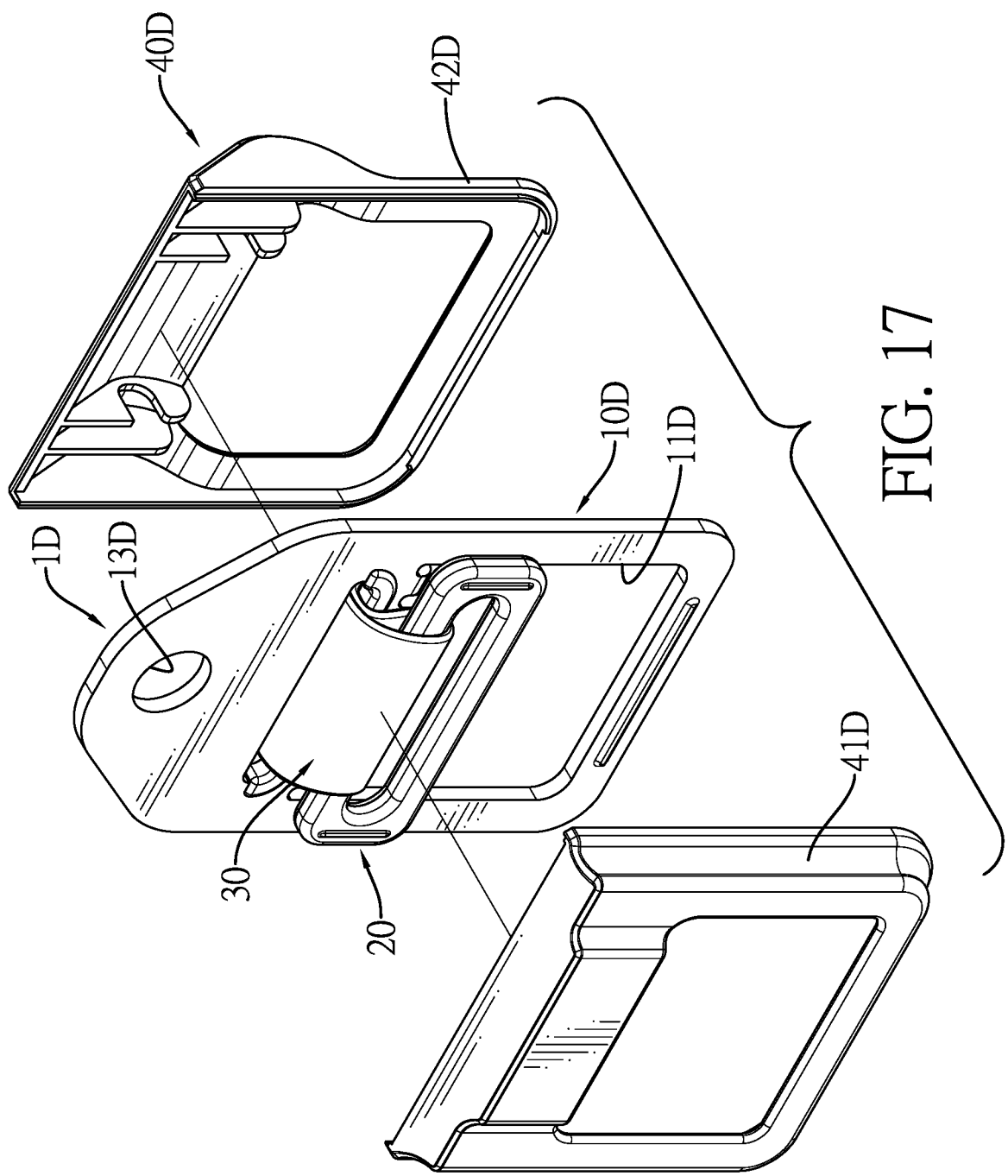
FIG. 17 is an exploded perspective view of the buffer device in FIG. 15 with a shell.
Figure 18:
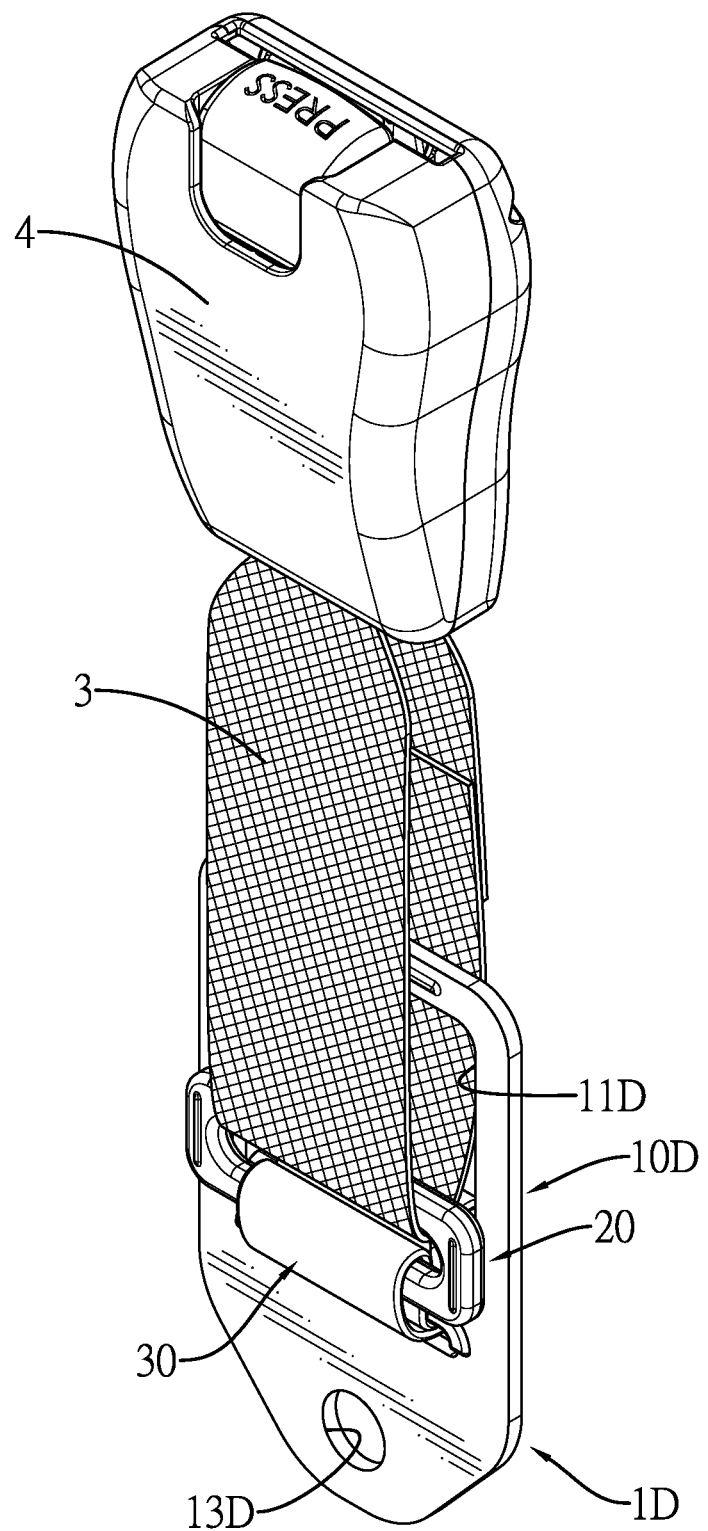
FIG. 18 is a perspective view of the buffer device in FIG. 15, showing a webbing is inserted through the buffer device.

With reference to FIG. 17, in the fourth embodiment of the buffer device 1D, the buffer device 1D further has a first semi-shell 41D and a second semi-shell 42D. The first semi-shell 41D is combined with the second semi-shell 42D to form a shell 40D. The plate 10D, the moveable ring 20, and the elastic member 30 are protected by the shell 40D.

Figure 19:
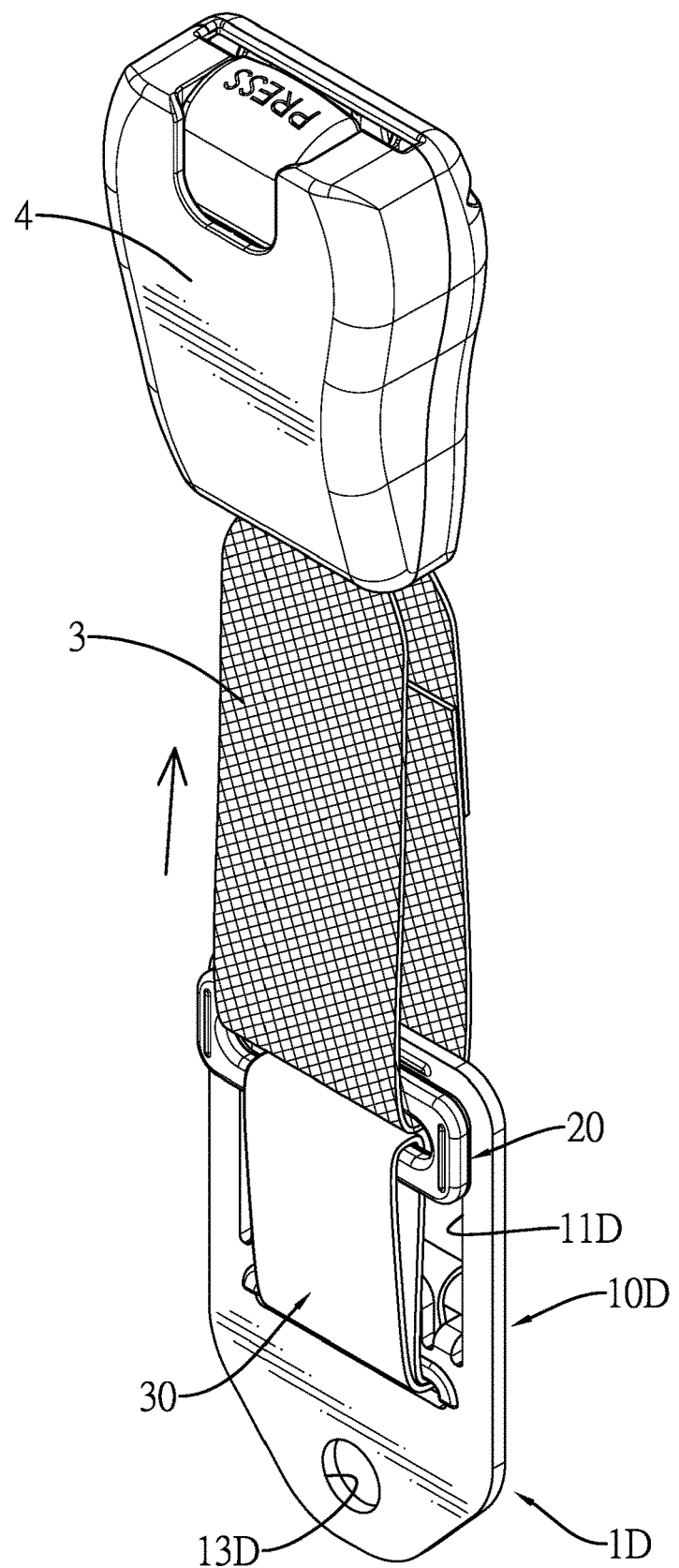
FIG. 19 is an operational perspective view of the buffer device in FIG. 15, showing a moveable ring is pulled by the webbing.

The fourth embodiment of the buffer device 1D adopts the flat portion formed on the top end of the base 14D and works as a fixing device for connecting the buckle 4 and the connecting belt 3. With reference to FIG. 19, the buffer device 1D is disposed upside down for connecting to the buckle 4. The insertion hole 11D of the plate 10 is deposited beside the seat of the vehicle. The fixing element is inserted through the retaining hole 13D of the plate 10D of the buffer device 1D for fixing the plate 10D beside the seat of the vehicle. The buffer device 1D works as the fixing device for connecting the buckle 4 and the connecting belt 3. An end of the connecting belt 3 opposite to the buffer device 1D is connected to the buckle 4. The connecting belt 3 is inserted through the insertion hole 11D of the plate 10 and the moveable ring 20. The end of the connecting belt 3 opposite to the buffer device 1D is connected to the buckle 4. The fixing element is inserted through the retaining hole 13D of the plate 10D of the buffer device 1D for fixing the plate 10D beside the seat of the vehicle. The elastic member 30 provides the cushioning resilience to the connecting belt 3 connected to the buckle 4 and being pulled.

Figure 20:
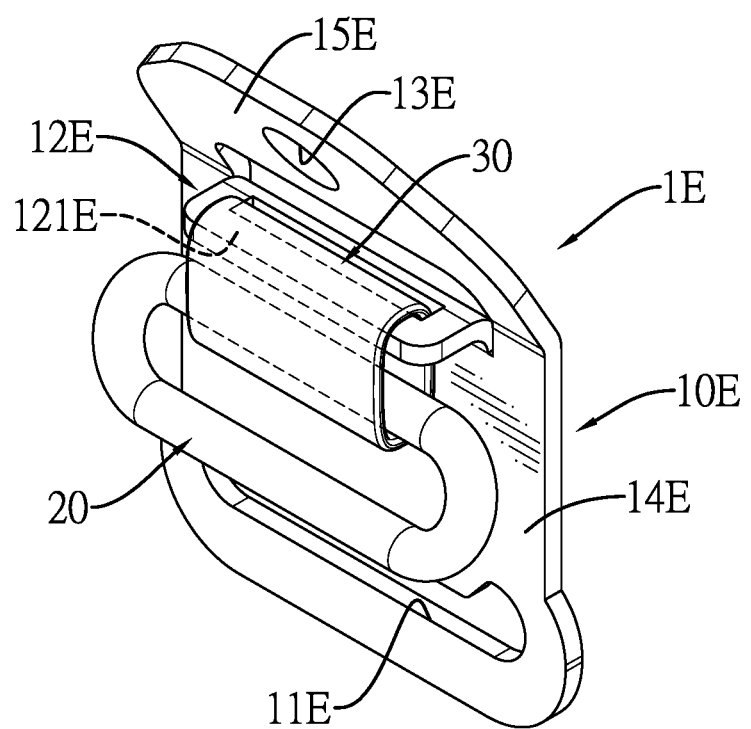
FIG. 20 is a perspective view of a fifth embodiment of a buffer device in accordance with the present invention.

With reference to FIG. 20, in the fifth embodiment of the buffer device 1E, the structure of the fifth embodiment of the buffer device 1E is similar to the structure of the first embodiment of the buffer device 1A. The difference between the first embodiment of the buffer device 1A and the fifth embodiment of the buffer device 1E is the connecting portion 12E of the plate 10E without the through hole. In the fifth embodiment of the buffer device 1E, the connecting portion 12E of the plate 10E is disposed on a front side of the base 14E and is located between the insertion hole 11E and the inclined portion 15E. The connecting portion 12E has a connecting rod 121E protruding out of the front side of the base 14E. The connecting rod 121E is bent and is connected to the base 14E. The plate 10E has a space formed between the connecting rod 121E of the connecting portion 12E and the base 14E and formed through the connecting portion 12E from top to bottom of the connecting portion 12E. The elastic member 30 is located at the front side of the plate 10E. The elastic member 30 has a first end and a second end. The first end of the elastic member 30 is wound on the connecting rod 121E. The second end of the elastic member 30 is deposited below the first end of the elastic member 30 and is wound on the moveable ring 20. When the elastic member 30 is not pulled, the moveable ring 20 is close to the top edge of the insertion hole 11E.

Figure 21:
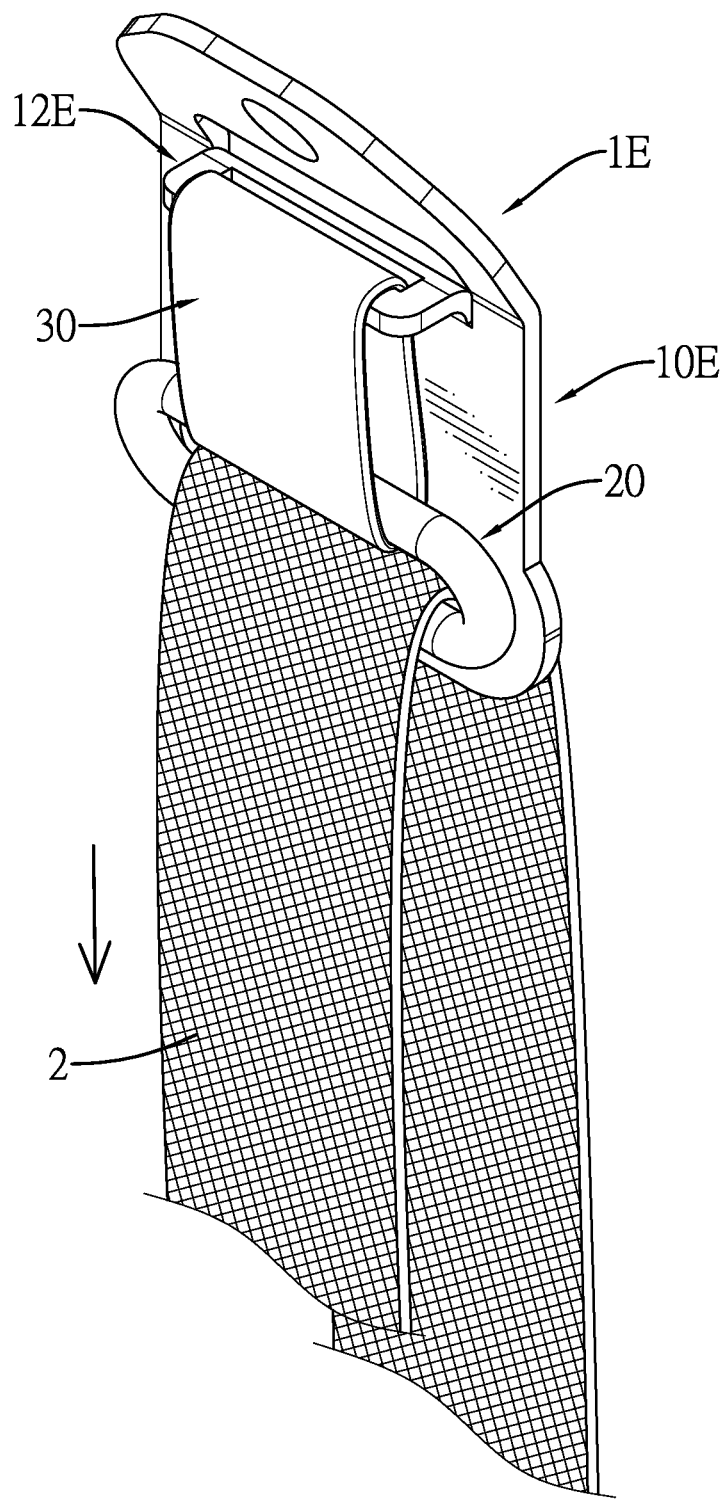
FIG. 21 is an operational perspective view of the buffer device in FIG. 20, showing a moveable ring is pulled by a webbing.

The fifth embodiment of the buffer device 1E is the guiding device and is connected to the webbing of the seat belt mechanism. The usage of the first embodiment of the buffer device 1A, the usage of the second embodiment of the buffer device 1B, and the usage of the fifth embodiment of the buffer device 1E are the same. The webbing 2 obliquely passed the front of the occupant's torso is forced by the external force and generates the pulling force. With reference to FIG. 21, the pulling force of the webbing 2 exerts forces on the moveable ring 20. The moveable ring 20 moves relative to the plate 10E by the tensile deformation of the elastic member 30. The elastic member 30 provides the cushioning resilience to decrease the impact force. When the external force is released, the webbing 2 is restored by the resilience of the elastic member 30 and the moveable ring 20. In the fifth embodiment of the buffer device 1E, the buffer device 1E works as the guiding device of the seat belt mechanism, and also may work as the fixing device for connecting the buckle 4 and the connecting belt 3 to provide the cushion effect.

With reference to FIG. 22, in the sixth embodiment of the buffer device 1F, the plate 10F has a base 14F and a bottom portion 17F. The base 14F is formed on the plate 10F. The bottom portion 17F is obliquely formed on a bottom end of the base 14F and protrudes out of the front side of the plate 10F. The insertion hole 11F is formed through the bottom portion 17F of the plate 10F. The retaining hole 13F is formed through the base 14F. The connecting portion 12F is disposed on a top end of the base 14F and is bent out of a front side of the base 14F.

The connecting portion 12F has a connecting hole 124F and a connecting rod 121F. The connecting hole 124F is formed through the connecting portion 12F. The connecting rod 121F is formed at a front side of the connecting hole 124F. The elastic member 30 has a first end and a second end. The first end of the elastic member 30 is wound on the connecting rod 121F of the connecting portion 12F. The second end of the elastic member 30 is deposited below the first end of the elastic member 30 and is wound on the moveable ring 20 located at the front side of the plate 10F. When the elastic member 30 is not pulled, the moveable ring 20 is above the insertion hole 11F.

Figure 24:
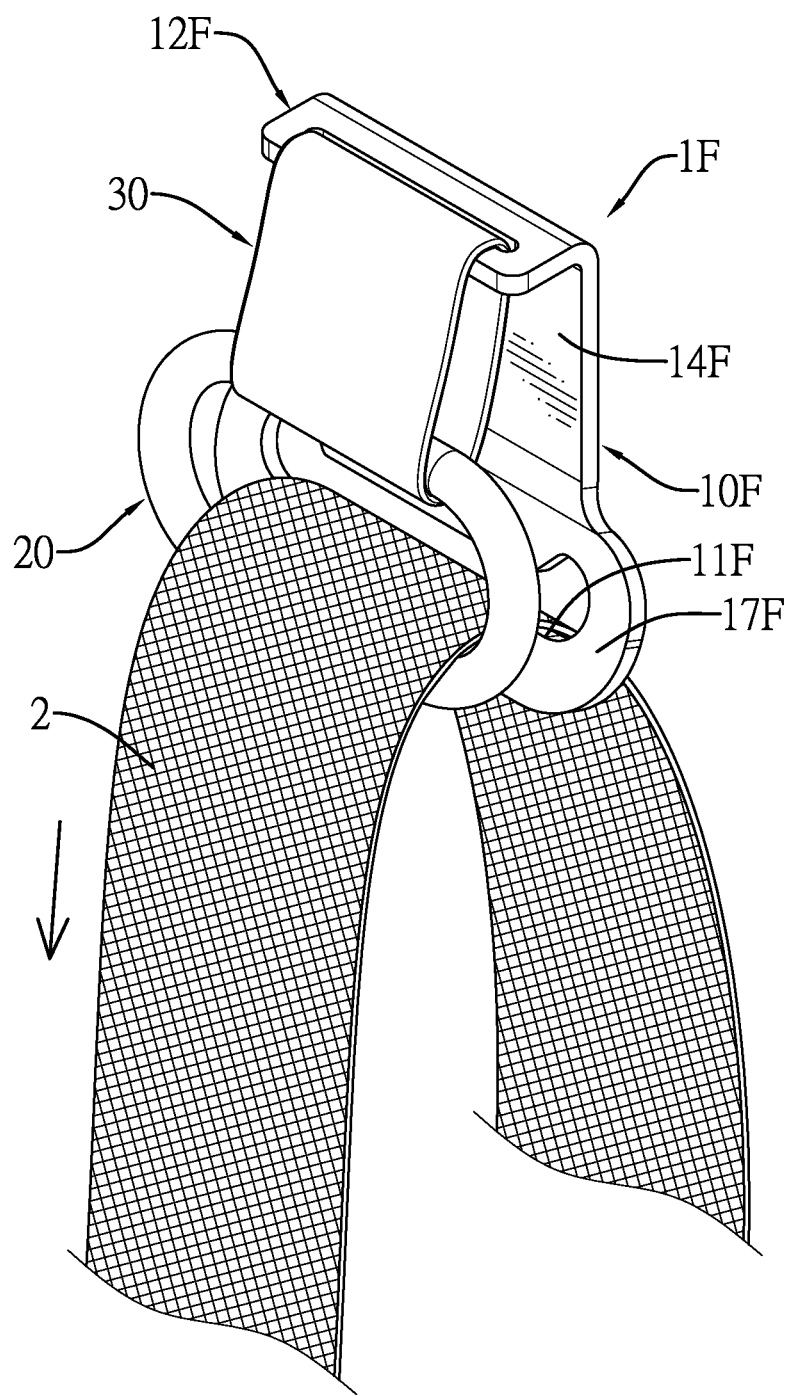
FIG. 24 is an operational perspective view of the buffer device in FIG. 22, showing a moveable ring is pulled by a webbing.
Figure 25:
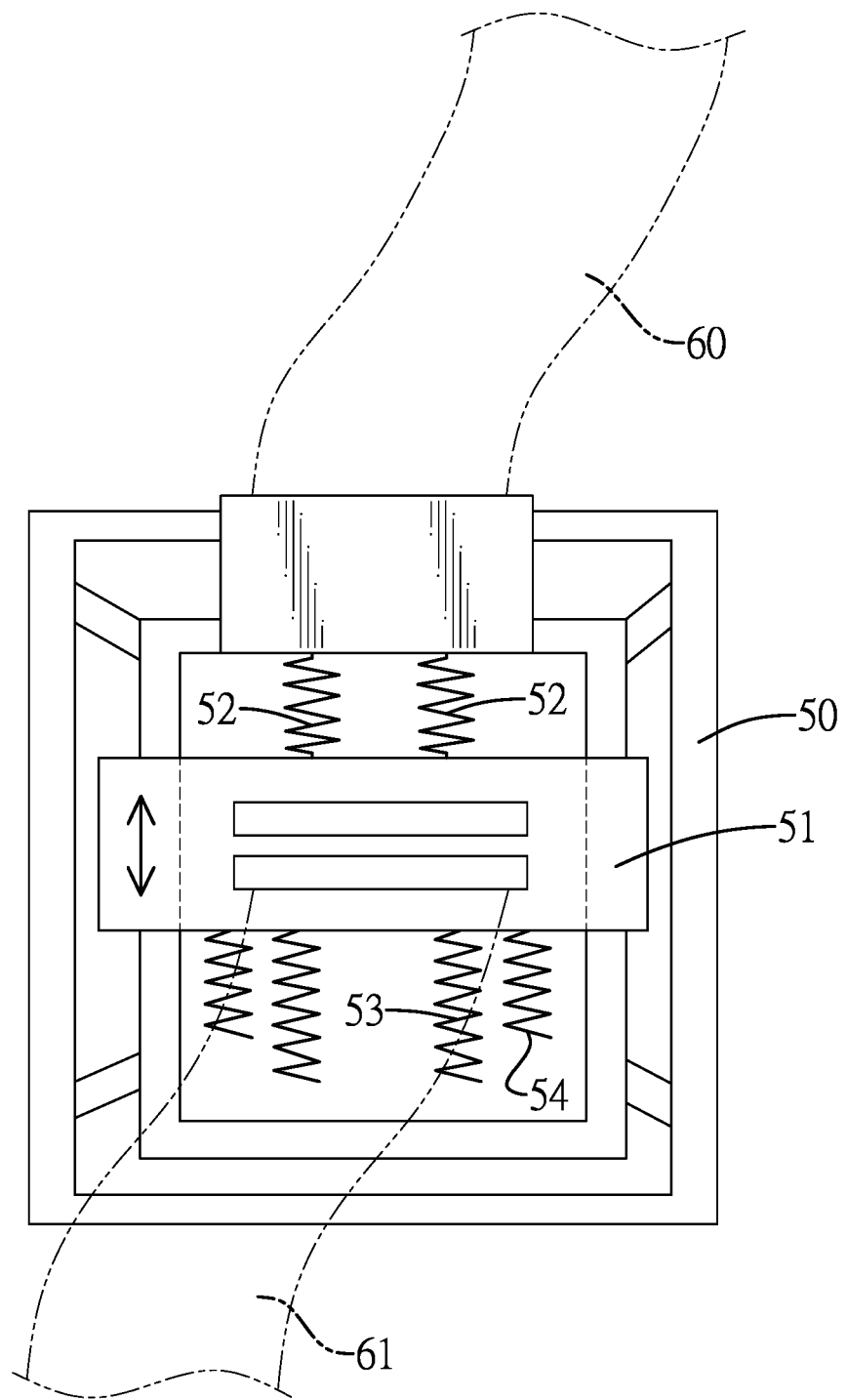
FIG. 25 is a front side view of a buffer device in accordance with the prior art, shown combined with a webbing.

The sixth embodiment of the buffer device 1F works as the guiding device and is connected to the webbing of the seat belt mechanism. The usage of the sixth embodiment of the buffer device 1F is same to the embodiments of the buffer device as described. With reference to FIGS. 22 to 24, to assemble the sixth embodiment of the buffer device 1F, a fixing element is inserted through the retaining hole 13F in the base 14F for fixing the plate 10F on the inner side wall of the vehicle. The webbing 2 extending out of the retractor 6 is inserted through the insertion hole 11F of the plate 10F and the slot 21 of the moveable ring 20. When the occupant fastens the webbing 2, the tongue 5 mounted on the webbing 2 is inserted into the buckle 4 mounted beside the seat in the vehicle. With reference to FIG. 24, the webbing 2 obliquely passed the front of the occupant's torso is forced by an external force and generates a pulling force. The moveable ring 20 of the buffer device 1F is pulled by the pulling force of the webbing 2. The moveable ring 20 moves relative to the plate 10F by the tensile deformation of the elastic member 30. The elastic member 30 provides the cushioning resilience to decrease the impact force. When the external force is released, the webbing 2 is restored by the resilience of the elastic member 30 and the moveable ring 20.

In the sixth embodiment of the buffer device 1F, the buffer device 1F is the guiding device of the seat belt mechanism, and also may be the fixing device for connecting the buckle 4 and the connecting belt 3 to provide the cushion effect.

Accordingly, as the buffer device is applied to the seat belt mechanism, the buffer device may work as the guiding device or the fixing device for connecting the buckle and the connecting belt. The webbing 2 is inserted through the insertion hole 11A, 11B, 11C, 11D, 11E, 11F and the moveable ring 20. The moveable ring 20 forced by the webbing moves relative to the plate 10A, 10B, 10C, 10D, 10E, 10F. The elastic member 30 provides the cushioning resilience to decrease the impact force. The moveable ring 20 is disposed outside and moves relative to the plate 10A, 10B, 10C, 10D, 10E, 10F. The cushioning travel is sufficiently long. The size of the plate 10A, 10B, 10C, 10D, 10E, 10F may be changed depending on the product demand, appropriately decreasing the volume and the cost of the plate 10A, 10B, 10C, 10D, 10E, 10F without affecting the cushion effect of the buffer device 1A, 1B, 1C, 1D, 1E, 1F.

Furthermore, the webbing 2 is inserted through the insertion hole 11A, 11B, 11C, 11D, 11E, 11F of the plate 10A, 10B, 10C, 10D, 10E, 10F and the slot 21 of the moveable ring 20. The plate 10A, 10B, 10C, 10D, 10E, 10F and the moveable ring 20 are made of rigid elements. The plate 10A, 10B, 10C, 10D, 10E, 10F is mounted in the vehicle by the fixing members. The buffer device 1A, 1B, 1C, 1D, 1E, 1F can bear the pulling force from the webbing 2. As the plate 10A, 10B, 10C, 10D, 10E, 10F is rigid and is fixed on the vehicle, even though the elastic member 30 connected with the plate 10A, 10B, 10C, 10D, 10E, 10F and the moveable ring 20 is damaged and loses the cushion effect, the plate 10A, 10B, 10C, 10D, 10E, 10F can still support the webbing 2 and bear the pulling force of the webbing 2 to ensure that the seat belt mechanism works well without losing efficacy. Therefore, the buffer device 1A, 1B, 1C, 1D, 1E, 1F of the present invention has high value in industrial utilization for the seat belt mechanism of the vehicle.

What is claimed is:

1. A buffer device comprising:
   a plate having
      a front side;
      an insertion hole formed through the plate;
      a connecting portion formed on the plate and above the insertion hole of the plate; and
      a retaining hole formed on the plate and above the insertion hole of the plate;
   a moveable ring moveably mounted out of the front side of the plate, and having a slot formed through the moveable ring and a top section;
   an elastic member connected with the connecting portion of the plate and the moveable ring, being an annular elastic webbing, and having
      a top section wound on the connecting portion of the plate; and
      a bottom section wound on the top section of the moveable ring and passing through the slot of the moveable ring;
   wherein the buffer device is applied to a seat belt mechanism in a vehicle for connecting a webbing to provide a cushion effect, the webbing is inserted through the insertion hole of the plate and the slot of the moveable ring, and the moveable ring of the buffer device is pulled by a pulling force of the webbing and moves relative to the plate by the tensile deformation of the elastic member.

2. The buffer device as claimed in claim 1, wherein the moveable ring has
   an outer surface; and
   a protective layer covered on the outer surface of the moveable ring and being made of rubber.

3. The buffer device as claimed in claim 1, wherein the plate has
   a rear side opposite to the front side of the plate;
   a base formed on the plate and having a rear side;
   the insertion hole being a rectangular hole, formed through the base of the plate, and having a top edge;
   the retaining hole formed through the plate above the insertion hole;
   a through hole formed through the base and located between the insertion hole and the retaining hole; and
   the connecting portion formed on the rear side of the base, located between the through hole and the insertion hole, and having
      two stopping parts formed on the top edge of the insertion hole and protruding out of the rear side of the plate, and the two stopping parts having two bottom surfaces; and
      a transverse rod disposed at the rear side of the plate and connected to the two bottom surfaces of the two stopping parts; and
   the elastic member has
      a first end inserted through the through hole of the plate, extending out of the rear side of the plate, and wound on the transverse rod; and
      a second end opposite to the first end of the elastic member, extending out of the front side of the plate, and connected to the top section of the moveable ring located at the front side of the plate.

4. The buffer device as claimed in claim 2, wherein the plate has
   a rear side opposite to the front side of the plate;
   a base formed on the plate and having a rear side;
   the insertion hole being a rectangular hole, formed through the base of the plate, and having a top edge;
   the retaining hole formed through the plate above the insertion hole;
   a through hole formed through the base and located between the insertion hole and the retaining hole; and
   the connecting portion formed on the rear side of the base, located between the through hole and the insertion hole, and having
      two stopping parts formed on the top edge of the insertion hole and protruding out of the rear side of the plate, and the two stopping parts having two bottom surfaces; and
      a transverse rod disposed at the rear side of the plate and connected to the two bottom surfaces of the two stopping parts; and
   the elastic member has
      a first end inserted through the through hole of the plate, extending out of the rear side of the plate, and wound on the transverse rod; and
      a second end opposite to the first end of the elastic member, extending out of the front side of the plate, and connected to the top section of the moveable ring located at the front side of the plate.

* * * * *